United States Patent
Harel et al.

(10) Patent No.: US 10,091,749 B2
(45) Date of Patent: Oct. 2, 2018

(54) REFERENCE SIGNAL GENERATION REDUNDANCY IN DISTRIBUTED ANTENNA SYSTEMS (DAS), AND RELATED DEVICES AND METHODS

(71) Applicant: Corning Optical Communications Wireless Ltd, Airport City (IL)

(72) Inventors: Dror Harel, Hod Hasharon (IL); Boris Radin, Ashdod (IL)

(73) Assignee: Corning Optical Communications Wireless Ltd, Airport City (IL)

( * ) Notice: Subject to any disclaimer, the term of this patent is extended or adjusted under 35 U.S.C. 154(b) by 135 days.

(21) Appl. No.: 15/156,543

(22) Filed: May 17, 2016

(65) Prior Publication Data
US 2016/0270016 A1    Sep. 15, 2016

Related U.S. Application Data

(63) Continuation of application No. PCT/IL2014/050967, filed on Nov. 6, 2014.
(Continued)

(51) Int. Cl.
*H04W 4/00* (2018.01)
*H04W 56/00* (2009.01)
(Continued)

(52) U.S. Cl.
CPC .......... *H04W 56/0015* (2013.01); *H04B 7/04* (2013.01); *H04J 3/0688* (2013.01); *H04L 7/0331* (2013.01); *H04W 24/02* (2013.01)

(58) Field of Classification Search
None
See application file for complete search history.

(56) References Cited

U.S. PATENT DOCUMENTS

| | | | | |
|---|---|---|---|---|
| 4,865,454 A | * | 9/1989 | Lazzarini | G01J 9/00 250/201.9 |
| 4,970,592 A | * | 11/1990 | Becker | H04N 7/04 348/496 |

(Continued)

FOREIGN PATENT DOCUMENTS

| | | |
|---|---|---|
| WO | 0126261 A2 | 4/2001 |
| WO | 2011052220 A1 | 5/2011 |
| WO | 2013139262 A1 | 9/2013 |

OTHER PUBLICATIONS

Patent Cooperation Treaty, International Search Report for PCT/IL14/050967, dated Apr. 24, 2015, 6 pages.
(Continued)

*Primary Examiner* — Farah Faroul
(74) *Attorney, Agent, or Firm* — C. Keith Montgomery

(57) ABSTRACT

Embodiments for providing reference signal generation redundancy in distributed antenna systems (DASs) are disclosed. To avoid a single point of failure in reference signal generation that could cause components relying on the reference signal to not operate properly, the reference signal generation circuits disclosed herein include a plurality of reference signal generation modules. One reference signal generation module is configured as the master reference signal generation module to generate a master reference signal distributed in the DAS. The other reference signal generation modules are configured as slave reference signal generation modules. If a failure is detected in the generation of the master reference signal in the master reference signal generation module, another slave reference signal generation module is reconfigured to be the new master reference signal generation module to generate the master reference signal. In this manner, the reference signal generation circuit does not have a single point of failure.

23 Claims, 16 Drawing Sheets

Related U.S. Application Data

(60) Provisional application No. 61/907,746, filed on Nov. 22, 2013.

(51) Int. Cl.
  *H04B 7/04*  (2017.01)
  *H04J 3/06*  (2006.01)
  *H04L 7/033*  (2006.01)
  *H04W 24/02*  (2009.01)

(56) References Cited

U.S. PATENT DOCUMENTS

| | | | |
|---|---|---|---|
| 5,526,527 A * | 6/1996 | Lipowski | H03L 7/087 331/11 |
| 5,852,728 A | 12/1998 | Matsuda et al. | |
| 6,150,889 A * | 11/2000 | Gulliver | H03L 7/0891 327/142 |
| 6,931,087 B1 | 8/2005 | Karol | |
| 9,281,854 B2 * | 3/2016 | Ames | H04B 1/16 |
| 2009/0033380 A1 | 2/2009 | McCoy | |
| 2009/0072911 A1* | 3/2009 | Ke | H03L 7/087 331/16 |
| 2010/0093391 A1 | 4/2010 | Saban et al. | |
| 2013/0279626 A1 | 10/2013 | Noh et al. | |

OTHER PUBLICATIONS

International Preliminary Report on Patentability for PCT/IL2014/050967, dated Jun. 2, 2016, 15 pages.

* cited by examiner

| FAILURE # | FAILURE | DETECTION | RECOVERY ACTION |
|---|---|---|---|
| F-1(1) SWITCHED BY | 126(1) | 136(1)=FAILURE | PROVIDE SECOND INPUT 145(1) TO BE SWITCHED BY FIRST REFERENCE SIGNAL SWITCH 142(1) TO PROVIDE SECOND REFERENCE SIGNAL 124(2) TO FIRST REFERENCE SIGNAL GENERATION MODULE OUTPUT 130(1) |
| F-1(2) SWITCHED BY | 126(2) | 136(2)=FAILURE | PROVIDE SECOND INPUT 145(2) TO BE SECOND REFERENCE SIGNAL SWITCH 142(2) TO PROVIDE FIRST REFERENCE SIGNAL 124(1) TO SECOND REFERENCE SIGNAL GENERATION MODULE OUTPUT 130(2) |
| F-2(1) SWITCHED BY | 142(1) | 136(3)=FAILURE | PROVIDE FIRST INPUT 143(2) TO BE SECOND REFERENCE SIGNAL SWITCH 142(2) TO PROVIDE SECOND REFERENCE SIGNAL 124(2) TO SECOND REFERENCE SIGNAL GENERATION MODULE OUTPUT 130(2) |
| F-2(1) SWITCHED BY | 142(1) | 136(3)=FAILURE | PROVIDE FIRST INPUT 143(2) TO BE SECOND REFERENCE SIGNAL SWITCH 142(2) TO PROVIDE SECOND REFERENCE SIGNAL 124(2) TO SECOND REFERENCE SIGNAL GENERATION MODULE OUTPUT 130(2) |
| F-2(2) SWITCHED BY | 142(2) | 136(4)=FAILURE | PROVIDE FIRST INPUT 143(1) TO BE FIRST REFERENCE SIGNAL SWITCH 142(1) TO PROVIDE FIRST REFERENCE SIGNAL 124(1) TO FIRST REFERENCE SIGNAL GENERATION MODULE OUTPUT 130(1) |
| F-3(1) SWITCHED BY | 128(2) | 136(5)=FAILURE | PROVIDE FIRST INPUT 143(1) TO BE FIRST REFERENCE SIGNAL SWITCH 142(1) TO PROVIDE FIRST REFERENCE SIGNAL 124(1) TO FIRST REFERENCE SIGNAL GENERATION MODULE OUTPUT 130(1) |
| F-3(2) SWITCHED BY | 128(1) | 136(6)=FAILURE | PROVIDE FIRST INPUT 143(2) TO BE SECOND REFERENCE SIGNAL SWITCH 142(2) TO PROVIDE SECOND REFERENCE SIGNAL 124(2) TO SECOND REFERENCE SIGNAL GENERATION MODULE OUTPUT 130(2) |

| FAILURE # | FAILURE | DETECTION | RECOVERY ACTION |
|---|---|---|---|
| F-5(1) SWITCHED BY | 184(1) | 190(1)=FAILURE 190(2)=OK | PROVIDE SECOND INPUT 196(2) TO BE SWITCHED BY FIRST PLL SIGNAL SWITCH 194(1) TO PROVIDE SECOND PLL HIGHER FREQUENCY REFERENCE SIGNAL 186(2) TO FIRST HIGHER FREQUENCY REFERENCE SIGNAL OUTPUT 200(1)) |
| F-5(2) SWITCHED BY | 184(2) | 190(2)=FAILURE 190(1)=OK | PROVIDE FIRST INPUT 196(1) TO BE SWITCHED BY FIRST PLL SIGNAL SWITCH 194(1) TO PROVIDE FIRST PLL HIGHER FREQUENCY REFERENCE SIGNAL 186(1) TO FIRST HIGHER FREQUENCY REFERENCE SIGNAL OUTPUT 200(1) |
| F-5(3) SWITCHED BY | 184(3) | 190(3)=FAILURE 190(4)=OK | PROVIDE SECOND INPUT 196(4) TO BE SWITCHED BY SECOND PLL SIGNAL SWITCH 194(2) TO PROVIDE FOURTH PLL HIGHER FREQUENCY REFERENCE SIGNAL 186(4) TO SECOND HIGHER FREQUENCY REFERENCE SIGNAL OUTPUT 200(2) |
| F-5(4) SWITCHED BY | 184(4) | 190(4)=FAILURE 190(3)=OK | PROVIDE FIRST INPUT 196(3) TO BE SWITCHED BY SECOND PLL SIGNAL SWITCH 194(2) TO PROVIDE THIRD PLL HIGHER FREQUENCY REFERENCE SIGNAL 186(3) TO SECOND HIGHER FREQUENCY REFERENCE SIGNAL OUTPUT 200(2) |
| F-6(1) SWITCHED BY | 184(1) 184(2) | 190(1)=FAILURE 190(2)=FAILURE 170(2)=OK | PROVIDE FIRST INPUT 196(3) TO BE SWITCHED BY SECOND PLL SIGNAL SWITCH 194(2) TO PROVIDE THIRD PLL HIGHER FREQUENCY REFERENCE SIGNAL 186(3) TO SECOND HIGHER FREQUENCY REFERENCE SIGNAL OUTPUT 200(2) AND TURN OFF FIRST PLL SIGNAL SWITCH 194(1) |
| F-6(2) SWITCHED BY | 184(3) 184(4) | 190(3)=FAILURE 190(4)=FAILURE 170(3)=OK | PROVIDE SECOND INPUT 196(2) TO BE SWITCHED BY FIRST PLL SIGNAL SWITCH 194(1) TO PROVIDE SECOND PLL HIGHER FREQUENCY REFERENCE SIGNAL 186(2) TO FIRST HIGHER FREQUENCY REFERENCE SIGNAL OUTPUT 200(1) AND TURN OFF SECOND PLL SIGNAL SWITCH 194(2) |

FIG. 7B

REFERENCE SIGNAL GENERATION REDUNDANCY IN DISTRIBUTED ANTENNA SYSTEMS (DAS), AND RELATED DEVICES AND METHODS

RELATED APPLICATIONS

This application is a continuation of International Application No. PCT/IL14/050967, filed Nov. 6, 2014, which claims the benefit of priority to U.S. Provisional Application No. 61/907,746, filed on Nov. 22, 2013, the contents of which are relied upon and incorporated herein by reference in their entireties.

BACKGROUND

The technology of the present disclosure relates generally to distributed antenna systems (DASs) that include distribution of reference signals, and particularly to providing redundancy for reference signal generation used to synchronize frequency conversion circuits in the DAS.

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Distributed communications or antenna systems communicate with wireless devices called "clients," "client devices," or "wireless client devices," which must reside within the wireless range or "cell coverage area" in order to communicate with an access point device. Distributed antenna systems are particularly useful to be deployed inside buildings or other indoor environments where client devices may not otherwise be able to effectively receive radio-frequency (RF) signals from a source, such as a base station for example. Example applications where distributed antenna systems can be used to provide or enhance coverage for wireless services include public safety, cellular telephony, wireless local access networks (LANs), location tracking, and medical telemetry inside buildings and over campuses.

One approach to deploying a distributed antenna system involves the use of RF antenna coverage areas, also referred to as "antenna coverage areas." Antenna coverage areas can be formed by remotely distributed antenna units, also referred to as remote units (RUs). The remote units each contain or are configured to couple to one or more antennas configured to support the desired frequency(ies) or polarization to provide the antenna coverage areas. Antenna coverage areas can have a radius in the range from a few meters up to twenty meters as an example. Combining a number of remote units creates an array of antenna coverage areas. Because the antenna coverage areas each cover small areas, there typically may be only a few users (clients) per antenna coverage area. This arrangement generates a uniform high quality signal enabling high throughput supporting the required capacity for the wireless system users.

As an example, FIG. 1 illustrates distribution of communications services to coverage areas 10(1)-10(N) of a DAS 12, wherein 'N' is the number of coverage areas. The coverage areas 10(1)-10(N) may be remotely located. In this regard, the remote coverage areas 10 are created by and centered on remote antenna units 14(1)-14(N) connected to a head-end equipment 16 (e.g., a head-end controller or head-end unit). The head-end equipment 16 may be communicatively coupled to a base station 18. In this regard, the head-end equipment 16 receives downlink communications signals 20D from the cellular base station 18 to be distributed to the remote antenna units 14(1)-14(N). The remote antenna units 14(1)-14(N) are configured to receive downlink communications signals 20D from the head-end equipment 16 over a communications medium 22 to be distributed to the respective coverage areas 10(1)-10(N) of the remote antenna units 14(1)-14(N). Each remote antenna unit 14(1)-14(N) may include an RF transmitter/receiver (not shown) and a respective antenna 24(1)-24(N) operably connected to the RF transmitter/receiver to wirelessly distribute the cellular services to client devices 26 within their respective coverage areas 10(1)-10(N). The remote antenna units 14(1)-14(N) are also configured to receive uplink communications signals 20U from the client devices 26 in their respective coverage areas 10(1)-10(N) to be distributed to the cellular base station 18. The size of a given coverage area 10(1)-10(N) is determined by the amount of RF power transmitted by the respective remote antenna unit 14(1)-14(N), the receiver sensitivity, antenna gain and the RF environment, as well as by the RF transmitter/receiver sensitivity of the cellular client device 26. Cellular client devices 26 usually have a fixed RF receiver sensitivity, so that the above-mentioned properties of the remote antenna units 14(1)-14(N) mainly determine the size of their respective remote coverage areas 10(1)-10(N).

As an example, it may be desired to synchronize the downlink communications signals 20D distributed to the remote antenna units 14(1)-14(N). For example, the downlink communications signals 20D may be Ethernet signals that need to be synchronized among remote antenna units 14(1)-14(N). As another example, communications medium 22 in the DAS 12 in FIG. 1 may have a lower frequency handling rating than the frequency of the downlink communications signals 20D and/or uplink communications signals 20U. In this regard, the DAS 12 in FIG. 1 may provide for frequency conversion of the downlink and uplink communications signals 20D, 20U before being provided on the communications medium 22 to be distributed. The downlink and uplink communications signals 20D, 20U can be frequency shifted to an intermediate frequency within the frequency rating of the communications medium 22.

In this regard, FIG. 2 is a schematic diagram of frequency conversion components that can be provided in the DAS 12 in FIG. 1 to frequency convert the downlink communications signals 20D in the head-end equipment 16 before being provided on the communications medium 22 to be distributed to the remote antenna units 14(1)-14(N). Only the components involved in frequency conversion of the downlink communications signals 20D are shown in FIG. 2 for illustration purposes, but other components can be provided to frequency convert the uplink communications signals 20U. As illustrated in FIG. 2, a master oscillator 28 is provided in the head-end equipment 16 to generate a reference signal 30. The reference signal 30 is provided to a local oscillator 32 in the head-end equipment 16 to control the generation of a mixing signal 34 by the local oscillator 32. A mixer 36 mixes the downlink communications signal 20D with the mixing signal 34 to down convert the frequency of the downlink communications signal 20D to provide an intermediate frequency (IF) downlink communications signal 20D(IF). For example, if the frequency of the downlink communications signal 20D is F1 and the frequency of the mixing signal 34 is F2, the frequency of the IF downlink communications signal 20D(IF) will be F1-F2 with appropriate filtering to filter off the sideband F1+F2. The IF downlink communications signal 20D(IF) is communicated over the communications medium 22 to the remote antenna units 14(1)-14(N).

With continuing reference to FIG. 2, using remote antenna unit 14(1) as an example, a mixer 38(1) is provided in the remote antenna unit 14(1) to up convert the frequency of the IF downlink communications signal 20D(IF) back to the original frequency of the downlink communications signal 20D. This is so the remote antenna unit 14(1) can distribute the downlink communications signal 20D in its original frequency to client devices 26 (in the coverage area 10(1) of the remote antenna unit 14(1)) (see FIG. 1). In this regard, a local oscillator 40 is provided that is configured to generate a mixing signal 42 of appropriate frequency to be mixed with the IF downlink communications signal 20D(IF) to frequency up convert and recover the downlink communications signal 20D as recovered downlink communications signal 20D(R). However, it may be important for the local oscillator 40 to generate the mixing signal 42 that is synchronized with the mixing signal 34 in the head-end equipment 16 so that the frequency and/or phase of the recovered downlink communications signal 20D(R) is synchronized to the frequency and/or phase of the downlink communications signal 20D. Thus, as illustrated in FIG. 2, the reference signal 30 generated by the master oscillator 28 is also provided over the communications medium 22 to the remote antenna units 14(1)-14(N). The reference signal 30 is used to control the generation of a mixing signal 42(1) generated by the local oscillator 40(1) in the remote antenna unit 14(1) so that the mixing signal 42(1) is synchronized with the mixing signal 34. In the example in FIG. 2, the reference signal 30 is provided to a phase-locked loop (PLL) circuit 44(1) that is configured to generate a PLL control signal 46(1) to control the local oscillator 40(1) to generate the mixing signal 42(1) in frequency and phase synchronization with the mixing signal 34. In this manner, the mixer 38(1) can generate the recovered downlink communications signal 20D(R) in frequency and phase synchronization with the original downlink communications signal 20D.

While the master oscillator 28 in the head-end equipment 16 in FIG. 2 provides for the ability to generate a reference signal 30 that can be used and distributed for synchronization purposes, it also provides for a single failure point in the DAS 12. If the master oscillator 28 fails to generate the reference signal 30, the components in the DAS 12 that receive and use the reference signal 30 for synchronization purposes may also fail as a result.

SUMMARY

Embodiments disclosed herein include reference signal generation circuits providing reference signal generation redundancy in distributed antenna systems (DASs). Related systems and methods are also disclosed. As a non-limiting example, the generated reference signal may be distributed to local oscillators in frequency conversion circuits in the DAS to synchronize local oscillators to each other for recovery of the original frequency and/or phase of frequency converted communications signals. To avoid a single point of failure in reference signal generation that could cause components relying on the reference signal in the DAS to not operate properly, the reference signal generation circuits disclosed herein include a plurality of reference signal generation modules. One reference signal generation module is configured as the master reference signal generation module to generate a master reference signal distributed in the DAS. The other reference signal generation modules are configured as slave reference signal generation modules. The slave reference signal generation modules receive and distribute the master reference signal from the master reference signal generation module. Thus, only the master reference signal is distributed for use in the DAS. If a failure is detected in the generation of the master reference signal in the master reference signal generation module, another slave reference signal generation module is reconfigured to be the new master reference signal generation module to generate the master reference signal. The previous master reference signal generation is reconfigured as a slave reference signal generation module. In this manner, the reference signal generation circuit does not have a single point of failure. The reference signal generation circuit can continue to generate a master reference signal to be distributed in the DAS even if a failure occurs in a particular reference signal generation module.

One embodiment of the disclosure relates to a reference signal generation circuit for providing reference signal generation redundancy in a distributed antenna system (DAS). The reference signal generation circuit comprises a first reference signal generation module. The first reference signal generation module comprises a first master oscillator. The first master oscillator is configured to generate a first reference signal as a first master oscillator output. The first reference signal generation module also comprises a first detector coupled to the first master oscillator output. The first detector is configured to detect the first reference signal generated by the first master oscillator, and provide a first detection output representing a detection state of the first reference signal. The first reference signal generation module also comprises a first reference signal switch. The first reference signal switch is configured to receive the first reference signal as a first input, receive a second reference signal from a second reference signal generation module as a second input, and receive a first switch control input representing the detection state of the first reference signal. The first reference signal switch is further configured to provide the first reference signal as a master reference signal on a first master reference signal generation module output to at least one first DAS component in a DAS based on the first switch control input representing detection of the first reference signal by the first detector. The first reference signal switch is also further configured to provide the second reference signal as the master reference signal on the first master reference signal generation module output to the at least one first DAS component in the DAS based on the first switch control input representing detection failure of the first reference signal by the first detector.

The reference signal generation circuit may also comprise a second reference signal generation module. The second reference signal generation module comprises a second oscillator configured to generate the second reference signal as a second oscillator output. The second reference signal generation module also comprises a second detector coupled to the second oscillator output. The second detector is configured to detect the second reference signal generated by the second oscillator, and provide a second detection output representing a detection state of the second reference signal. The second reference signal generation module also comprises a second reference signal switch. The second reference signal switch is configured to receive the second reference signal as a first input, receive the first reference signal from the first reference signal generation module as a second input, and receive a second switch control input representing the detection state of the second reference signal. The second reference signal switch is also further configured to provide the second reference signal as the master reference signal on a second reference signal generation module output to at least one second DAS component in the DAS based on the second switch control input representing detection of the second reference signal by the second detector. The second reference signal switch is also further configured to provide the first reference signal as the master reference signal on the second reference signal generation module output to the at least one second DAS component in the DAS based on the second switch control input representing detection failure of the second reference signal by the second detector.

An additional embodiment of the disclosure relates to a method of reference signal generation redundancy in a distributed antenna system (DAS). The method comprises generating a first reference signal as a first master oscillator output from a first master oscillator. The method also comprises detecting the first reference signal generated by the first master oscillator. The method also comprises providing the first reference signal on a first master reference signal generation module output as a master reference signal to at least one first DAS component in a DAS based on detecting the first reference signal by a first detector. The method also comprises providing a second reference signal on the first master reference signal generation module output as the master reference signal to the at least one first DAS component in the DAS based on detecting failure of the first reference signal by the first detector.

An additional embodiment of the disclosure relates to a DAS. The DAS comprises a plurality of DAS components. The plurality of DAS components comprises a central unit. The central unit comprises at least one central unit downlink circuit. The at least one central unit downlink circuit is configured to receive a downlink communications signal in a downlink communications path and provide the received downlink communications signal to at least one remote antenna unit among a plurality of remote antenna units. The central unit also comprises at least one central unit uplink circuit. The at least one central unit uplink circuit is configured to receive an uplink communications signal from a remote antenna unit among the plurality of remote antenna units in an uplink communications path. The plurality of DAS components also comprises the plurality of remote antenna units. The plurality of remote antenna units each comprise at least one antenna. The plurality of remote antenna units also each comprise a remote downlink circuit configured to receive downlink communications signals in the downlink communications path and wirelessly transmit the received downlink communications signals over the at least one antenna to at least one client device. The plurality of remote antenna units also each comprise a remote uplink path circuit configured to wirelessly receive uplink communications signals from the at least one antenna from at least one client device in the uplink communications path and provide the received uplink communications signals over the uplink communications path to the at least one central unit uplink circuit. The plurality of DAS components also comprises a reference signal generation circuit. The reference signal generation circuit comprises a first reference signal generation module. The first reference signal generation module is configured to provide a first reference signal as a master reference signal to at least one DAS component among the plurality of DAS components based on detection of the first reference signal by a first detector. The first reference signal generation module is also configured to provide a second reference signal as the master reference signal to the at least one DAS component based on detecting failure of the first reference signal by the first detector.

Additional features and advantages will be set forth in the detailed description which follows, and in part will be readily apparent to those skilled in the art from the description or recognized by practicing the embodiments as described in the written description and claims hereof, as well as the appended drawings.

Both the foregoing general description and the detailed description are merely exemplary, and are intended to provide an overview or framework to understand the nature and character of the claims. The provide a further understanding, and are incorporated in and constitute a part of this specification. The drawings illustrate one or more embodiment(s), and together with the description serve to explain the principles of the various embodiments.

BRIEF DESCRIPTION OF THE DRAWINGS

FIG. 5 is a failure and recovery action table illustrating exemplary failure modes detected in the reference signal generation circuit in FIG. 4 and exemplary recovery actions to be communicated to the reference signal generation circuit in response, for the reference signal generation circuit to continue to generate the master reference signal for the DAS;

FIGS. 7A and 7B are failure and recovery action tables illustrating exemplary failure modes detected in the reference signal generation circuit in FIG. 6 and exemplary recovery actions to be communicated to the reference signal generation circuit in response, for the high frequency reference signal generation modules to continue to generate the higher frequency reference signal for the DAS;

DETAILED DESCRIPTION

Various embodiments will be further clarified by the following examples.

Figure 1:
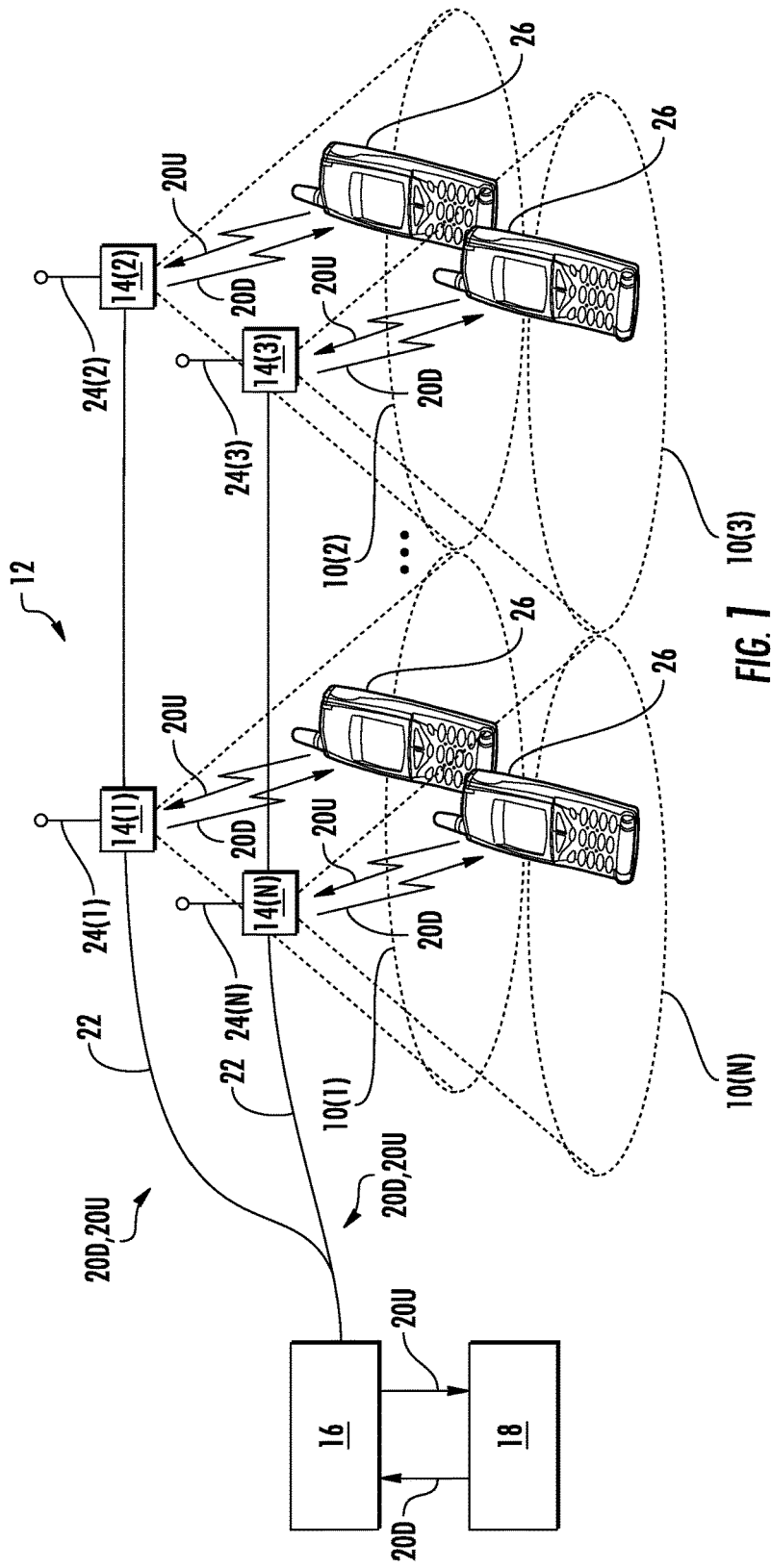
FIG. 1 is a schematic diagram of an exemplary distributed antenna system (DAS) capable of distributing radio frequency (RF) communications services to client devices.
Figure 2:
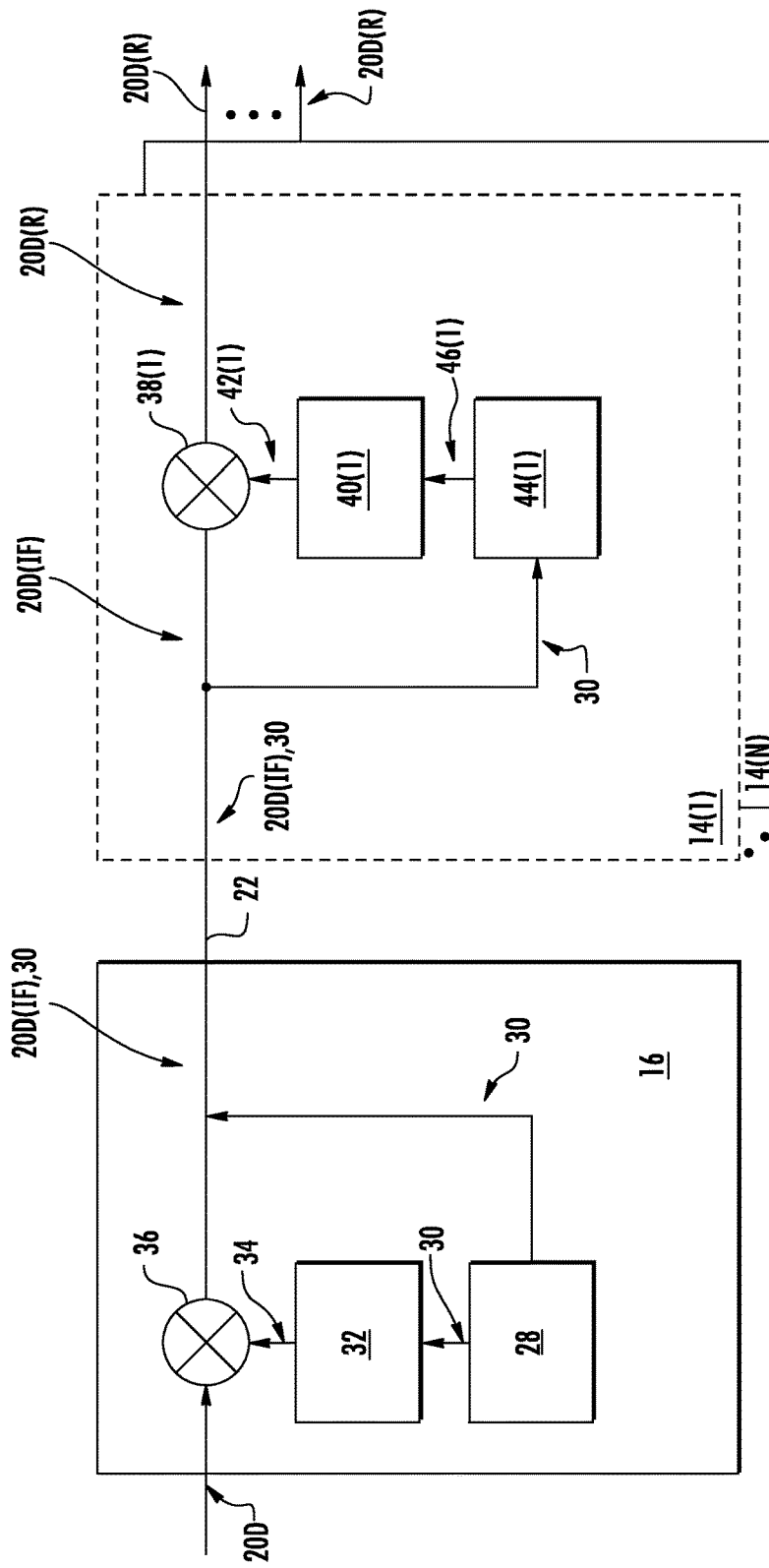
FIG. 2 is a schematic diagram of exemplary reference signal generation and distribution in a DAS, wherein the reference signal is used to control the synchronization of local oscillators used to frequency convert downlink communications signals to be distributed over communications media to remote antenna units.
Figure 3:
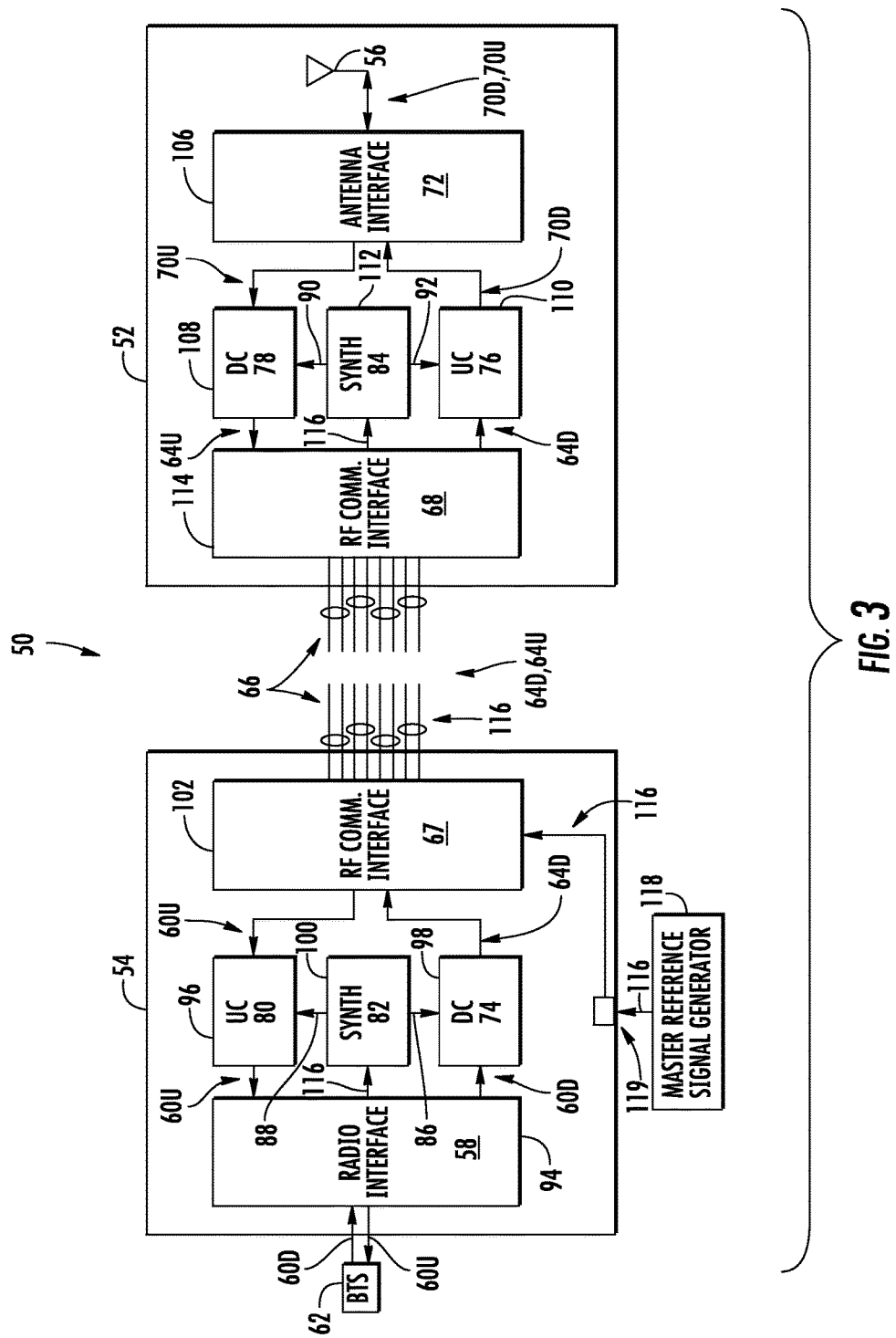
FIG. 3 is a schematic diagram of an exemplary distributed antenna system employing frequency conversion circuits synchronized by a reference signal to frequency convert received downlink communications signals distributed to remote antenna units and received uplink communications signals distributed from the remote antenna units to a central unit.
Figure 4:
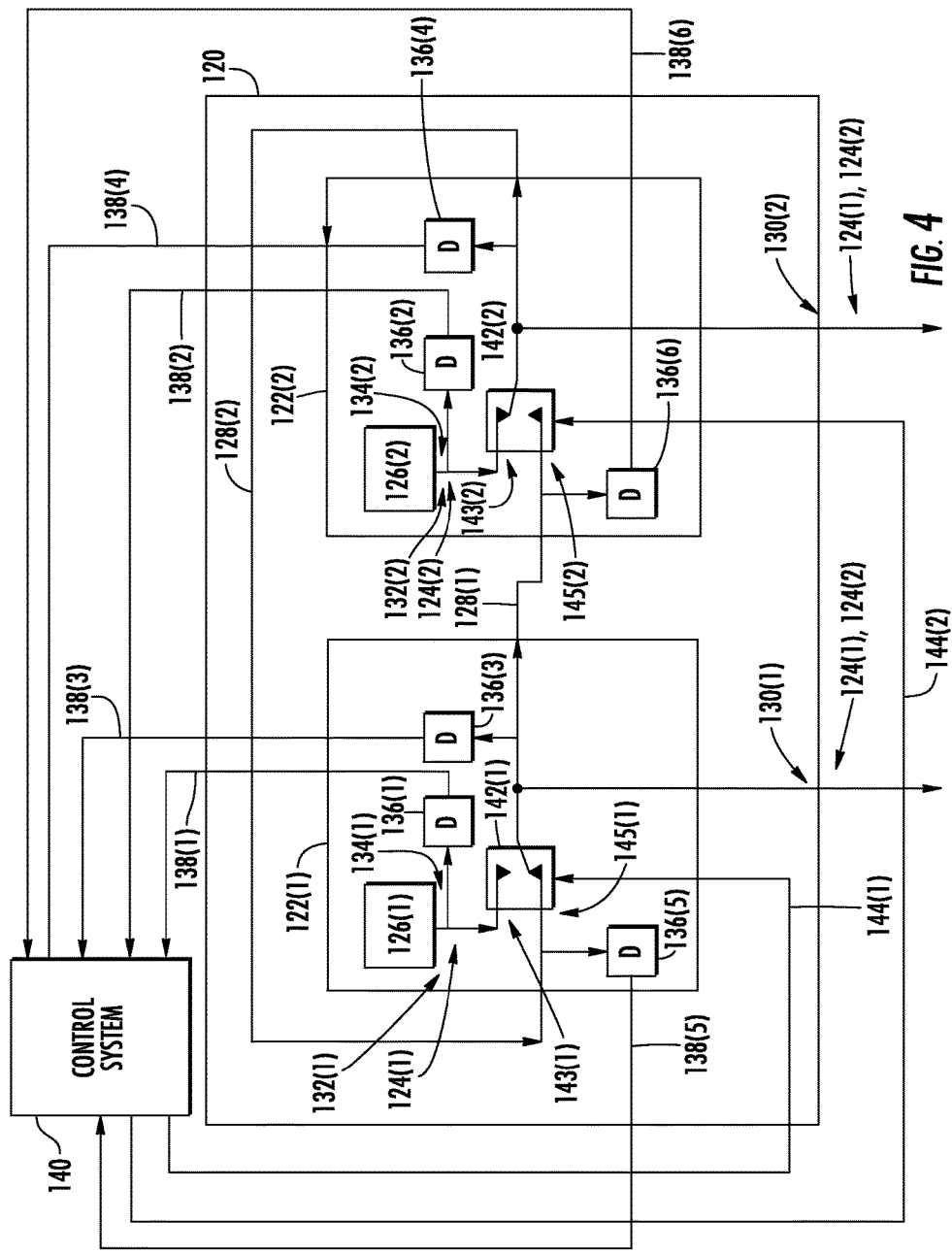
FIG. 4 is a schematic diagram of an exemplary reference signal generation circuit that includes reference signal generation modules provided in redundant configuration to generate a master reference signal for a DAS.

Before discussing examples of reference signal generation circuits configured to provide reference signal generation redundancy in distributed antenna systems (DASs) starting at FIG. 4, an example of DAS 50 that can employ a master reference signal for synchronization of frequency conversion circuits to provide frequency conversion of downlink and uplink communications signals, and/or other synchronization purposes, is first described with regard to FIG. 3. The reference signal generation circuits described herein can be employed in the DAS 50 in FIG. 3.

In this regard, FIG. 3 is a schematic diagram of an exemplary DAS 50 for providing communications services. The DAS 50 is configured to create one or more antenna coverage areas for establishing communications with wireless client devices located in the radio frequency (RF) range of the antenna coverage areas created by remote units 52. The remote units 52 may also be termed remote antenna units if they contain one or more antennas to support wireless communications. The DAS 50 provides multiple types of RF communications services, for example cellular radio services as a non-limiting example. In this embodiment, the DAS 50 includes a central unit 54, one or more remote antenna units 52 and a communications medium 66 that communicatively couples the central unit 54 to the remote antenna units 52. The central unit 54 is configured to provide communications services to the remote antenna units 52 for wireless propagation to client devices in communication range of an antenna 56 of the remote antenna unit 52. The remote antenna unit 52 may also be configured to support wired communications services. Note that although only one remote antenna unit 52 is illustrated as being communicatively coupled to the central unit 54 in FIG. 3, a plurality of remote antenna units 52 can be communicatively coupled to the central unit 54 to receive communications services from the central unit 54.

With continuing reference to FIG. 3, the central unit 54 includes a radio interface 58 (or RF interface) that is configured to receive downlink communications signals 60D for communications services to be provided to the remote antenna unit 52. For example, the communications service may be a cellular radio service, but could also be any other type of communications service, including data communications services. The radio interface 58 may receive the downlink communications signals 60D to be provided to the remote antenna unit 52 from a base transceiver station (BTS) 62 as a non-limiting example. As will be discussed in more detail below, the central unit 54 is configured to provide downlink communications signals 64D through a communications interface 67 to provide the communications services based on the downlink communications signals 60D over a communications medium 66 to the remote antenna unit 52. The communications interface 67 could include a cable interface that interfaces with a cable medium (e.g., coaxial cable, fiber optic cable) for sending and receiving communications signals. The remote antenna unit 52 includes a communications interface 68 configured to receive the downlink communications signals 64D and provide downlink communications signals 70D providing the communications services to an antenna interface 72. The antenna 56 electrically coupled to the antenna interface 72 is configured to wirelessly radiate the downlink communications signals 70D to wireless clients in wireless communications range of the antenna 56. The communications interface 68 could include a cable interface that interfaces with a cable medium (e.g., coaxial cable, fiber optic cable) for sending and receiving communications signals, including the downlink communications signals 70D.

The downlink communications signals 60D, 70D may be the same signals as the downlink communications signals 64D, 64U, respectively. Alternatively, as provided in the DAS 50 of FIG. 3, the downlink communications signals 60D are frequency shifted by down converter circuitry (DC) 74 to provide downlink communications signals 64D. The downlink communications signals 60D are down converted to the downlink communications signals 64D to an intermediate frequency (IF) different from (e.g., lower or higher than) the frequency of downlink communications signals 60D. To recover the downlink communications signals 60D at the remote antenna unit 52 to be radiated by the antenna 56, an up converter circuitry (UC) 76 is provided in the remote antenna unit 52 to up convert the downlink communications signals 64D to the downlink communications signals 70D. The downlink communications signals 70D are of the same or substantially the same frequency as the downlink communications signals 60D in this embodiment. The downlink communications signals 70D may be accurately reproduced in in frequency to the downlink communications signals 60D, such as through employing a frequency correction circuit in the UC 76, as a non-limiting example. The downlink communications signals 70D may also accurately reproduced in phase to the downlink communications signals 60D, such as through employing a phase locked loop (PLL) circuit in the UC 76 as another non-limiting example. Note that although the example of DAS 50 in FIG. 3 downshifts the frequency of downlink communications signals 60D to an IF, such is not required. The DAS 50 may be configured to upshift the frequency of the downlink communications signals 60D.

With continuing reference to FIG. 3, the radio interface 58 is also configured to receive uplink communications signals 60U to provide uplink communications received at the remote antenna unit 52 from wireless client devices to the central unit 54. In this regard, the radio interface 58 receives the uplink communications signals 64U from the remote antenna unit 52 via the communications interfaces 68, 67 in the remote antenna unit 52 and central unit 54, respectively. The remote antenna unit 52 is configured to provide the uplink communications signals 64U through the communications interface 68 to provide uplink communications for the communications services over the communications medium 66 to the communications interface 67 of the central unit 54. The uplink communications signals 64U are based on the uplink communications signals 70U received by the antenna 56 of the remote antenna unit 52 from wireless client devices.

With continuing reference to FIG. 3, the uplink communications signals 70U are frequency shifted by down converter circuitry (DC) 78 in the remote antenna unit 52 to provide uplink communications signals 64U. The uplink communications signals 70U are down converted to the uplink communications signals 64U to an intermediate frequency (IF) that is different from the frequency of uplink communications signals 70U. To recover the uplink communications signals 70U at the central unit 54 to be provided to the BTS 62, an up converter circuitry (UC) 80 is provided in the central unit 54 to up convert the uplink communications signals 64U to the uplink communications signals 60U. The uplink communications signals 60U are of the same or substantially the same frequency as the uplink communications signals 70U in this embodiment. The uplink communications signals 60U may be accurately reproduced in frequency to the uplink communications signals 70U, such as through employing a frequency locked loop (FLL) circuit in the UC 80, as a non-limiting example. The uplink communications signals 60U may also accurately reproduced in phase to the uplink communications signals 70U, such as through employing a phase locked loop (PLL) circuit in the UC 80 as another non-limiting example. Note that although the example of DAS 50 in FIG. 3 downshifts the frequency of uplink communications signals 70U to an IF, such is not required. The DAS 50 may be configured to upshift the frequency of the uplink communications signals 70D.

With continuing reference to FIG. 3, to provide reference signals for frequency conversion by the DCs 74, 78 and the UCs 80, 76 in the central unit 54 and the remote antenna unit 52, respectively, synthesizer circuits 82, 84 are provided. The synthesizer circuit 82 is provided in the central unit 54. The synthesizer circuit 84 is provided in the remote antenna unit 52. The synthesizer circuit 82 in the central unit 54 provides one or more local oscillator (LO) signals 86 to the DC 74 for frequency shifting the downlink communications signals 60D to the downlink communications signals 64D at a different, intermediate frequency (IF). The synthesizer circuit 82 also provides one or more reference signals 88 to the UC 80 for frequency shifting the uplink communications signals 64U from the IF to the frequency of the communications services to provide the uplink communications signals 60U.

As a non-limiting example, the LO signals 86, 88 may be directly provided to mixers in the DC 74 and UC 80 to control generation of mixing RF signals (not shown) to be mixed with the downlink communications signals 60D and the uplink communications signals 64U, respectively, for frequency shifting. As another non-limiting example, the LO signals 86, 88 may not be provided directly to mixers in the DC 74 and UC 80. The LO signals 86, 88 may be provided to control other circuitry that provides signals to control the mixers in the DC 74 and the UC 80. The oscillators in the DC 74 and the UC 80 generate mixing RF signals to be mixed with the downlink communications signals 60D and the uplink communications signals 64U, respectively, for frequency shifting.

The synthesizer circuit 84 in the remote antenna unit 52 provides one or more LO signals 90 to the DC 78 for frequency shifting the uplink communications signals 70U to the uplink communications signals 64U at a different, intermediate frequency (IF). The synthesizer circuit 84 also provides one or more LO signals 92 to the UC 76 for frequency shifting the downlink communications signals 64D from the IF to the frequency of the communications services to provide the downlink communications signals 70D. As a non-limiting example, the LO signals 90, 92 may be directly provided to mixers in the DC 78 and UC 76 to control generation of mixing RF signals (not shown) to be mixed with the downlink communications signals 64D and the uplink communications signals 70U, respectively, for frequency shifting. As another non-limiting example, the LO signals 90, 92 may not be provided directly to mixers in the DC 78 and UC 76. The LO signals 90, 92 may be provided to control other circuitry that provides signals to control the mixers in the DC 78 and the UC 76. The oscillators in the synthesizer circuit 84 and the UC 76 generate mixing RF signals to be mixed with the downlink communications signals 64D and the uplink communications signals 70U, respectively, for frequency shifting.

With continuing reference to the DAS 50 in FIG. 3, it may be desired for the LO signals 86, 92 described above that are generated by the synthesizer circuits 82, 84, respectively, to be synchronized. In this manner, the UC 76 in the remote antenna unit 52 can receive and use the LO signal 92 that is synchronized with the LO signal 86 to accurately recover the downlink communications signals 70D. If the LO signals 86, 92 are not synchronized, their respective frequencies and/or phases may drift away from each other, thus, causing the recovered downlink communications signals 70D to not exactly replicate the frequency and/or phase of the original downlink communications signal 60D received by the central unit 54 in the DAS 50. For example, if the LO signals 86, 92 are frequency synchronized to each other, the recovered downlink communications signals 70D will have the same frequency as the original downlink communications signal 60D. If the LO signals 86, 92 are phase synchronized to each other, the recovered downlink communications signals 70D will have the same frequency and phase as the original downlink communications signal 60D. Similarly, if the LO signals 88, 90 are not generated synchronized, their respective frequencies and/or phases may drift away from each other, thus, causing the recovered uplink communications signals 60U to not exactly replicate the frequency and/or phase of the original uplink communications signals 70U received by the remote antenna unit 54 in the DAS 50.

In this regard, the DAS 50 in FIG. 3 includes a master reference signal 116. The master reference signal 116 is generated by a master reference signal generator 118. The master reference signal generator 118 may be provided within the central unit 54, or may be provided in a device external to the central unit 54, where the master reference signal 116 is fed to an input port 119 of the central unit 54. The master reference signal 116 may be provided by a high stability master oscillator (not shown) provided within the master reference signal generator 118. The master reference signal 116 is provided to local oscillators provided within the synthesizer circuit 82 and used to generate the LO signals 86, 88. The synthesizer circuits 82, 84 each use the received master reference signal 116 to synchronize generation of their respective LO signals 86, 88 and 90, 92. Thus, LO signals 86, 92 used to downconvert the downlink communications signals 60D in the central unit 54 and upconvert the downlink communications signals 64D in the remote antenna unit 52 to provide the recovered downlink communications signals 70D, can be synchronized based on the master reference signal 116. The master reference signal 116 is also distributed over the communications medium 66 to the remote antenna unit 52 to be provided to the synthesizer circuit 84 therein. This also allows the master reference signal 116 to be provided to local oscillators provided within the synthesizer circuit 84 and used to generate the LO signals 90, 92. Thus, LO signals 90, 88 used to downconvert the uplink communications signals 70U in the remote antenna unit 52 and upconvert the uplink communications signals 64U in the central unit 54, respectively, to provide the recovered uplink communications signals 60U, can be synchronized based on the master reference signal 116.

While the master reference signal generator 118 in the DAS 50 in FIG. 3 provides for the ability to generate the master reference signal 116 for synchronization purposes, it also provides for a single failure point in the DAS 50. If the master reference signal generator 118 fails to generate the master reference signal 116, the components in the DAS 50 that receive and use the master reference signal 116 for synchronization or other purposes may also fail or not properly operate as a result. In the example of the DAS 50 in FIG. 3, failure of the master reference signal generator 118 to generate the master reference signal 116 may cause the recovered downlink communications signals 70D to not be synchronized with the downlink communications signals 60D, and similarly the recovered uplink communications signals 60U to not be synchronized with the uplink communications signals 70U.

In this regard, FIG. 4 is a schematic diagram of an exemplary reference signal generation circuit 120 that is configured to provide master reference signal redundancy in a DAS. For example, the reference signal generation circuit 120 may be used to provide the master reference signal generator 118 in the DAS 50 in FIG. 3 to provide master reference signal 116 redundancy. In this manner, the DAS 50 is not dependent on a single failure of a single device or component that generates the sole master reference signal for the DAS. As will be discussed in more detail below, with regard to FIG. 4, the reference signal generation circuit 120 includes a first reference signal generation module 122(1) and a second reference signal generation module 122(2) in this example. Both the first reference signal generation module 122(1) and the second reference signal generation module 122(2) are each configured to generate respective first master reference signal 124(1) and second reference signal 124(2) from respective first master oscillator 126(1) and second oscillator 126(2). The first master oscillator 126(1) and second oscillator 126(2) are selected to produce their respective master reference signal 124(1) and reference signal 124(2) at the same or approximately the same frequency in a highly stable manner in this example.

With continuing reference to FIG. 4, and as will be discussed in more detail below, the first reference signal generation module 122(1) is configured to provide the first master reference signal 124(1) on a first master reference signal generation module output 130(1). The first reference signal generation module 122(1) is also configured to provide the first master reference signal 124(1) over the first communications medium 128(1) to the second reference signal generation module 122(2) in a master-slave configuration. The first reference signal generation module 122(1) is the master module, and the second reference signal generation module 122(2) is the slave module in this configuration. The second reference signal generation module 122(2) will provide the received first master reference signal 124(1) from the first reference signal generation module 122(1) on its second reference signal generation module output 130(2). In this manner, the master reference signal generated on the first master reference signal generation module output 130(1) and second reference signal generation module output 130(2) will be the first master reference signal 124(1). The first master reference signal generation module output 130(1) and second reference signal generation module output 130(2) can be communicatively coupled to any DAS components in a DAS that are configured to use a master reference signal 124 generated by the reference signal generation circuit 120 for synchronization or other purposes. The first master reference signal 124(1) and second reference signals 124(2) can also be tied together in a single master reference signal generation module output (not shown), if desired.

However, if for any reason, the first master oscillator 126(1) in the first reference signal generation module 122(1) fails to generate the first master reference signal 124(1), the reference signal generation circuit 120 is configured to cause the second reference signal 124(2) generated by the second oscillator 126(2) in the second reference signal generation module 122(2) to be provided to the first reference signal generation module 122(1) over the second communications medium 128(2). The first reference signal generation module 122(1) is the slave module, and the second reference signal generation module 122(2) is the master module in this configuration. The first reference signal generation module 122(1) will provide the received second reference signal 124(2) from the second reference signal generation module 122(2) on its first master reference signal generation module output 130(1). Thus, the master reference signal generated on the first master reference signal generation module outputs 130(1) and second reference signal generation module outputs 130(2) will be the second reference signal 124(2) in this scenario of the second reference signal generation module 122(2) being the master module. In this regard, the reference signal generation circuit 120 is configured to provide redundant generation of the master reference signal 124 to any DAS components in a DAS coupled to the first master reference signal generation module outputs 130(1) and second reference signal generation module outputs 130(2) of the reference signal generation circuit 120.

More specific exemplary details of the reference signal generation circuit 120 in FIG. 4 and its ability to provide master reference signal 124 redundancy, as either first master reference signal 124(1) or second reference signal 124(2), will now be described.

In this regard with reference to FIG. 4, as discussed above, the first reference signal generation module 122(1) includes the first master oscillator 126(1). The first master oscillator 126(1) is configured to generate a first reference signal 132(1) as the first master reference signal 124(1) at a first master oscillator output 134(1). The first reference signal generation module 122(1) also includes a first detector 136(1) that is coupled to the first master oscillator output 134(1). The first detector 136(1) is configured to detect the first master reference signal 124(1) generated by the first master oscillator 126(1) and provide a first detection output 138(1) representing a detection state of the first master reference signal 124(1). In this manner, the first detection output 138(1) can be received and analyzed by a control system 140 to determine if the first master reference signal 124(1) is being generated by the first master oscillator 126(1). If the first master reference signal 124(1) is not being generated by the first master oscillator 126(1), the control system 140 can cause a first reference signal switch 142(1) to provide the second reference signal 124(2) received from the second reference signal generation module 122(2) over the second communications medium 128(2) simultaneously on the first master reference signal generation module output 130(1) and on the second reference signal generation module output 130(2) to provide master reference signal generation redundancy. The control system 140 may be provided within the reference signal generation circuit 120 or external to the reference signal generation circuit 120 in a DAS and/or another component of a DAS.

In this regard, with continuing reference to FIG. 4, the first reference signal switch 142(1) is configured to receive the first master reference signal 124(1) from the first master oscillator 126(1) as a first input 143(1). The first reference signal switch 142(1) is also configured to receive the second reference signal 124(2) from the second reference signal generation module 122(2) as a second input 145(1). The first reference signal switch 142(1) is also configured to receive a first switch control input 144(1) representing the detection state of the first master reference signal 124(1) detected by the first detector 136(1). The first reference signal switch 142(1) is configured to switch the first master reference signal 124(1) to the first master reference signal generation module output 130(1) based on the first switch control input 144(1) representing detection of the first master reference signal 124(1) by the first detector 136(1). As discussed above, if the first master reference signal 124(1) is detected by the first detector 136(1), the control system 140 provides the first switch control input 144(1) to provide for the first reference signal generation module 122(1) to be the master module in this scenario.

However, if the control system 140 determines that the first master reference signal 124(1) was not detected by the first detector 136(1), meaning that failure has occurred in the first master oscillator 126(1) or other issue preventing the first master reference signal 124(1) from being detected, the first reference signal switch 142(1) is configured to switch the received second reference signal 124(2) from the second communications medium 128(2) to the first master reference signal generation module output 130(1). The first reference signal switch 142(1) is configured to switch the received second reference signal 124(2) from the second communications medium 128(2) to the first master reference signal generation module output 130(1) based on the first switch control input 144(1) representing detection failure of the first master reference signal 124(1) by the first detector 136(1). This failure is also represented in the exemplary failure and recovery action table 139 in FIG. 5 as failure number F-1(1). As shown therein, failure number F-1(1) relates to a failure of the first master oscillator 126(1), which can be detected by the first detector 136(1). The recovery action in response to failure number F-1(1) is to switch the received second reference signal 124(2) from the second communications medium 128(2) on the second input 145(2) to the first master reference signal generation module output 130(1). Note that in FIG. 4, the first reference signal switch 142(1) will be set to a neutral state to avoid the first master reference signal 124(1) being provided by the first master reference signal generation module output 130(1) to avoid the existence of both the first master reference signal 124(1) and the second reference signal 124(2) being provided at the same time.

With continuing reference to FIG. 4, the second reference signal generation module 122(2) is also similarly configured with similar components as the first reference signal generation module 122(1) described above, to facilitate reference signal generation redundancy. In this regard, as discussed above, the second reference signal generation module 122(2) includes the second oscillator 126(2). The second oscillator 126(2) is configured to generate a second reference signal 132(2) as the second reference signal 124(2) at a second oscillator output 134(2). The second reference signal generation module 122(2) also includes a second detector 136(2) that is coupled to the second oscillator output 134(2). The second detector 136(2) is configured to detect the second reference signal 124(2) generated by the second oscillator 126(2) and provide a second detection output 138(2) representing a detection state of the second reference signal 124(2). In this manner, the second detection output 138(2) can be received and analyzed by the control system 140 to determine if the second reference signal 124(2) is being generated by the second oscillator 126(2). If the second reference signal 124(2) is not being generated by the second oscillator 126(2), the control system 140 can cause a second reference signal switch 142(2) to provide the received first master reference signal 124(1) received from the first reference signal generation module 122(1) over the first communications medium 128(1) on the second reference signal generation module output 130(2) to provide master reference signal generation redundancy. Note that in FIG. 4, the first reference signal switch 142(1) will be set to a neutral state to avoid the first master reference signal 124(1) being provided by the first master reference signal generation module output 130(1) to avoid the existence of both the first master reference signal 124(1) and the second reference signal 124(2) being provided by the first reference signal generation module 122(1) at the same time.

In this regard, with continuing reference to FIG. 4, the second reference signal switch 142(2) is configured to receive the second reference signal 124(2) from the second oscillator 126(2) as a first input 143(2). The second reference signal switch 142(2) is also configured to receive the first master reference signal 124(1) from the first reference signal generation module 122(1) as a second input 145(2). The second reference signal switch 142(2) also receives a second switch control input 144(2) representing a decision taken based on the detection state of the second reference signal 124(2) detected by the second detector 136(2). The second reference signal switch 142(2) is configured to switch the second reference signal 124(2) to the second reference signal generation module output 130(2) based on the second switch control input 144(2) representing detection of the second reference signal 124(2) by the second detector 136(2). The control system 140 provides the second switch control input 144(2) representing detection of the second reference signal 124(2) by the second detector 136(2) additionally if the first detector 136(1) in the first reference signal generation module 122(1) does not detect the first master reference signal 124(1). As discussed above, in this scenario, the control system 140 provides the second switch control input 144(2) to provide for the second reference signal generation module 122(2) to be the master module. Note that in FIG. 4, the second reference signal switch 142(2) will be set to a neutral state to avoid the second reference signal 124(2) being provided by the second reference signal generation module output 130(2) to avoid the existence of both the first master reference signal 124(1) and the second reference signal 124(2) being provided by the second reference signal generation module 122(2) at the same time.

However, if the control system 140 determines that the second reference signal 124(2) was not detected by the second detector 136(2), meaning that failure has occurred in the second oscillator 126(2) or other issue preventing the second reference signal 124(2) from being detected, the second reference signal switch 142(2) is configured to switch the received first master reference signal 124(1) from the first communications medium 128(1) to the second reference signal generation module output 130(2) based on the second switch control input 144(2) representing detection failure of the second reference signal 124(2) by the second detector 136(2). This failure is also represented in the exemplary failure and recovery action table 139 in FIG. 5 as failure number F-1(2). As shown therein, failure number F-1(2) relates to a failure of the second oscillator 126(2), which can be detected by the second detector 136(2). The recovery action in response to failure number F-1(2) is to switch the received first master reference signal 124(1) from the first communications medium 128(1) on the second input 145(2) to the second reference signal generation module output 130(2).

As discussed above, the control system 140 controls this decision by generating the first and second switch control inputs 144(1), 144(2) to control which master reference signal among the first reference signal 124(1) and second reference signal 124(2) is to be provided on the first master reference signal generation module output 130(1) and second reference signal generation module output 130(2), respectively. Thus, in one embodiment, the control system 140 should be configured so that first and second switch control inputs 144(1), 144(2) always cause the first and second reference signal switches 142(1), 142(2) to both switch either the first master reference signal 124(1) or the second reference signal 124(2) on the first master reference signal generation module output 130(1) and the second reference signal generation module output 130(2), respectively.

The above discussion regarding the reference signal generation circuit 120 also assumes that control system 140 is configured to determine which of the first and second reference signal generation modules 122(1), 122(2) should be selected as the master reference signal generation module if both the first and second detectors 136(1), 136(2) detect their respective first reference signal 124(1) and second reference signal 124(2). In this example, it is assumed that the control system 140 is configured to provide for the first reference signal generation module 122(1) to be the master reference signal generation module if the first master reference signal 124(1) is detected. However, the opposite could be configured in the control system 140, where the control system 140 is configured to provide for the second reference signal generation module 122(2) to be the master reference signal generation module if the second reference signal 124(2) is detected. However, other failures may occur in the first and second reference signal generation modules 122(1), 122(2) that would be advantageous to detect to allow the control system 140 to select the desired master reference signal generation module beyond detection of the first master reference signal 124(1) and second reference signal 124(2) at the first master oscillator output 134(1) and second oscillator output 134(2).

In this regard, with continuing reference to FIG. 4, additional detectors can be provided in the first and second reference signal generation modules 122(1), 122(2) to assist the control system 140 in determining which of the first and second reference signal generation modules 122(1), 122(2) should be selected as the master reference signal generation module. The first reference signal generation module 122(1) of the reference signal generation circuit 120 also includes a third detector 136(3) in this example. The third detector 136(3) is coupled to the first master reference signal generation module output 130(1) of the first reference signal switch 142(1). The third detector 136(3) is configured to detect the first master reference signal generation module output 130(1) provided by the first reference signal switch 142(1). In this manner, the third detector 136(3) can detect if a failure has occurred in the first reference signal switch 142(1) or with a master reference signal 124 switched by the first reference signal switch 142(1). The third detector 136(3) is also configured to provide a third detection output 138(3) representing a detection state of the master reference signal 124 switched by the first reference signal switch 142(1). In this manner, the third detection output 138(3) can be received and analyzed by the control system 140 to determine if the first reference signal switch 142(1) has an issue preventing the switching of a selected master reference signal 124 on the first master reference signal generation module output 130(1).

If the first reference signal switch 142(1) has an issue preventing the switching of a selected master reference signal 124 on the first master reference signal generation module output 130(1), the control system 140 can cause the second reference signal switch 142(2) in the second reference signal generation module 122(2) to provide the second reference signal 124(2) on the second reference signal generation module output 130(2) to provide master reference signal generation redundancy. This failure is also represented in the exemplary failure and recovery action table 139 in FIG. 5 as failure number F-2(1). As shown therein, failure number F-2(1) relates to a failure of the first reference signal switch 142(1), which can be detected by the third detector 136(3). The recovery action in response to failure number F-2(1) is to provide for the first input 143(2) to be switched by the second reference signal switch 142(2) in the second reference signal generation module 122(2) to provide the second reference signal 124(2) to the second reference signal generation module output 130(2).

With continuing reference to FIG. 4, the second reference signal generation module 122(2) of the reference signal generation circuit 120 also includes a fourth detector 136(4) in this example. The fourth detector 136(4) is coupled to the second reference signal generation module output 130(2) of the second reference signal switch 142(2). The fourth detector 136(4) is configured to detect the second reference signal generation module output 130(2) provided by the second reference signal switch 142(2). In this manner, the fourth detector 136(4) can detect if a failure has occurred in the second reference signal switch 142(4) or with a master reference signal 124 switched by the second reference signal switch 142(2). The fourth detector 136(4) is also configured to provide a fourth detection output 138(4) representing a detection state of the master reference signal 124 switched by the second reference signal switch 142(2). The fourth detection output 138(4) can be received and analyzed by the control system 140 to determine if the second reference signal switch 142(2) has an issue preventing the switching of a selected master reference signal 124 on the second reference signal generation module output 130(2).

If the second reference signal switch 142(2) has an issue preventing the switching of a selected master reference signal 124 on the second reference signal generation module output 130(2), the control system 140 can cause the first reference signal switch 142(1) in the first reference signal generation module 122(1) to provide the first master reference signal 124(1) on the first master reference signal generation module output 130(1) to provide master reference signal generation redundancy. This failure is also represented in the failure and recovery action table 139 in FIG. 5 as failure number F-2(2). As shown therein, failure number F-2(2) related to a failure of the second reference signal switch 142(2), which can be detected by the fourth detector 136(4). The recovery action in response to failure number F-2(2) is to provide for the first input 143(1) to be switched by the first reference signal switch 142(1) in the first reference signal generation module 122(1) to provide the first master reference signal 124(1) to the first master reference signal generation module output 130(1).

With continuing reference to FIG. 4, the first reference signal generation module 122(1) of the reference signal generation circuit 120 also includes a fifth detector 136(5) in this example. The fifth detector 136(5) is coupled to the second input 145(1) of the first reference signal switch 142(1). The fifth detector 136(5) is configured to detect the second reference signal 124(2) received from the second reference signal generation module 122(2) on the second communications medium 128(2) as the second input 145(1) into the first reference signal switch 142(1). In this manner, the fifth detector 136(5) can detect if a failure has occurred in receiving the second reference signal 124(2) from the second reference signal generation module 122(2). For example, the second communications medium 128(2) may have been damaged or severed. As another example, a failure may have occurred in a component or components of the second reference signal generation module 122(2) that prevented the second reference signal 124(2) from being received as the second input 145(1) of the first reference signal switch 142(1). The fifth detector 136(5) is also configured to provide a fifth detection output 138(5) representing a detection state of the second reference signal 124(2) received by the first reference signal generation module 122(1).

With continuing reference to FIG. 4, the fifth detection output 138(5) can be received and analyzed by the control system 140 to determine if the second reference signal 124(2) is received on the second input 145(1). If the second reference signal 124(2) is not received on the second input 145(1), the control system 140 can cause the first reference signal switch 142(1) in the first reference signal generation module 122(1) to switch the first master reference signal 124(1) onto the first master reference signal generation module output 130(1) to provide master reference signal generation redundancy. This failure is also represented in the exemplary failure and recovery action table 139 in FIG. 5 as failure number F-3(1). As shown therein, failure number F-3(1) relates to a failure of the second communications medium 128(2), which can be detected by the fifth detector 136(5). The recovery action in response to failure number F-3(1) is to provide for the first input 143(1) to be switched by the first reference signal switch 142(1) in the first reference signal generation module 122(1) to provide the first master reference signal 124(1) to the first master reference signal generation module output 130(1).

With continuing reference to FIG. 4, the second reference signal generation module 122(2) of the reference signal generation circuit 120 also includes a sixth detector 136(6) in this example. The sixth detector 136(6) is coupled to the second input 145(2) of the second reference signal switch 142(2). The sixth detector 136(6) is configured to detect the first master reference signal 124(1) received from the first reference signal generation module 122(1) on the first communications medium 128(1) as the second input 145(2) into the second reference signal switch 142(2). In this manner, the sixth detector 136(6) can detect if a failure has occurred in receiving the first master reference signal 124(1) from the first reference signal generation module 122(1). For example, the first medium 128(1) may have been damaged or severed. As another example, a failure may have occurred in a component or components of the first reference signal generation module 122(1) that prevented the first master reference signal 124(1) from being received as the second input 145(2) of the second reference signal switch 142(2). The sixth detector 136(6) is also configured to provide a sixth detection output 138(6) representing a detection state of the first master reference signal 124(1) received by the second reference signal generation module 122(2).

With continuing reference to FIG. 4, the sixth detection output 138(6) can be received and analyzed by the control system 140 to determine if the first master reference signal 124(1) is received on the second input 145(2). If not, the control system 140 can cause the second reference signal switch 142(2) in the second reference signal generation module 122(2) to switch the second reference signal 124(2) onto the second reference signal generation module output 130(2) to provide master reference signal generation redundancy. This failure is also represented in the exemplary failure and recovery action table 139 in FIG. 5 as failure number F-3(2). As shown therein, failure number F-3(2) relates to a failure of the second communications medium 128(2), which can be detected by the sixth detector 136(6). The recovery action in response to failure number F-3(2) is to provide for the first input 143(2) to be switched by the second reference signal switch 142(2) in the second reference signal generation module 122(2) to provide the second reference signal 124(2) to the second reference signal generation module output 130(2).

As discussed above, it may be desired to provide for the master reference signals 124(1) or 124(2) to be provided to DAS components in a DAS for synchronization or other purposes. The master reference signals 124(1) or 124(2) can be provided directly to such DAS components. Alternatively, it may be desired to use the master reference signals 124(1) or 124(2) to generate other additional reference signals that may be at different frequencies from the frequency of the master reference signals 124(1) or 124(2). For example, it may be desired to use the redundantly generated master reference signals 124(1) or 124(2) to generate higher frequency reference signals.

Figure 6:
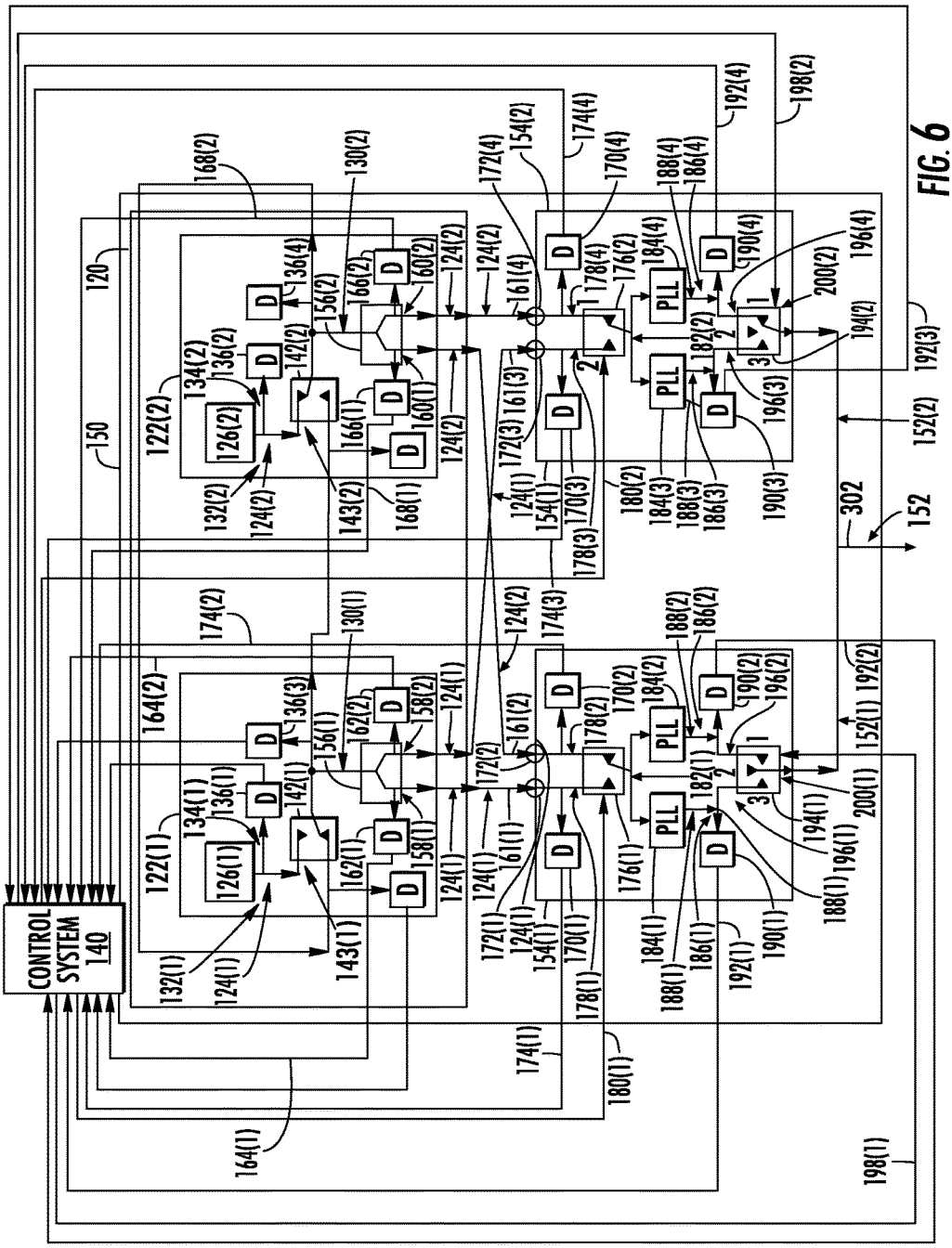
FIG. 6 is a schematic diagram of another exemplary reference signal generation circuit for generating a reference signal in a DAS, wherein the reference signal generation circuit includes the reference signal generation modules provided in redundant configuration in FIG. 4 to generate the master reference signal, and exemplary higher frequency reference signal generation modules interconnected to the reference signal generation modules, the higher frequency reference signal generation modules also provided in redundant configuration to generate a higher frequency reference signal of the master reference signal for the DAS.

In this regard, FIG. 6 is a schematic diagram of another exemplary reference signal generation circuit 150 for reference signals in redundancy. The reference signal generation circuit 150 includes the reference signal generation circuit 120 in FIG. 4 to generate the first master reference signal 124(1) and second reference signal 124(2) as previously described. As will be discussed in more detail below, the first master reference signal 124(1) and second reference signal 124(2) are used to control the generation of first and second higher frequency reference signals 152(1), 152(2) in respective first and second higher frequency reference signal generation modules 154(1), 154(2) to provide a higher frequency reference signal 152 based on the first master reference signal 124(1) and second reference signal 124(2). The same failure numbers and recovery actions provided in the table in FIG. 5 and described above are applicable to the reference signal generation circuit 150 in FIG. 6.

In this regard, with reference to FIG. 6, the first and second reference signal generation modules 122(1), 122(2) are configured differently from their configuration in FIG. 4. Additional first and second signal splitters 156(1), 156(2)

are provided in respective first and second reference signal generation modules 122(1), 122(2). Each of the first and second signal splitters 156(1), 156(2) is coupled to a respective master reference signal generation module output 130(1), 130(2), as illustrated in FIG. 6. The first and second signal splitters 156(1), 156(2) are provided so that the respective master reference signals 124(1), 124(2) can be provided on respective first outputs 158(1), 158(2) of the first signal splitter 156(1) and second outputs 160(1), 160(2) of the second signal splitter 156(2), to each higher frequency reference signal generation module 154(1), 154(2). The first master reference signal 124(1) and second reference signal 124(2) are provided by the first and second reference signal generation modules 122(1), 122(2), respectively, to the first higher frequency reference signal generation module 154(1) on first and second communications mediums 161(1), 161(2), respectively. The first master reference signal 124(1) and second reference signal 124(2) are also provided by the first and second reference signal generation modules 122(1), 122(2), respectively, to the second higher frequency reference signal generation module 154(2) on third and fourth communications lines 161(3), 161(4), respectively. This is to provide redundancy in providing the first master reference signal 124(1) and second reference signal 124(2) to each of the first and second higher frequency reference signal generation modules 154(1), 154(2), in case a failure occurs in one of the first or second reference signal generation modules 122(1), 122(2).

With continuing reference to FIG. 6, detectors 162(1), 162(2) are provided in the first reference signal generation module 122(1) to detect if the first master reference signal 124(1) is being provided on the respective first outputs 158(1), 158(2) of the first signal splitter 156(1). The detectors 162(1), 162(2) include respective detection outputs 164(1), 164(2) to provide the detection state of the first master reference signal 124(1) provided on the respective first outputs 158(1), 158(2) to the control system 140. Also, detectors 166(1), 166(2) are provided in the second reference signal generation module 122(2) to detect if the second reference signal 124(2) is being provided on the respective second outputs 160(1), 160(2) of the second signal splitter 156(2). The detectors 166(1), 166(2) include respective detection outputs 168(1), 168(2) to provide the detection state of the second reference signal 124(2) provided on the respective outputs 160(1), 160(2) to the control system 140.

With continuing reference to FIG. 6, the first higher frequency reference signal generation module 154(1) includes a first higher frequency signal detector 170(1) coupled to a first higher frequency signal generation module input 172(1), which is coupled to the first communications medium 161(1). The first higher frequency signal detector 170(1) is configured to detect the first master reference signal 124(1) provided by the first reference signal generation module 122(1). The first higher frequency signal detector 170(1) is also configured to provide a first higher frequency detection output 174(1) representing a detection state of the first master reference signal 124(1) provided by the first reference signal generation module 122(1). In this manner, the control system 140 can determine if the first master reference signal 124(1) is being received from the first reference signal generation module 122(1) for master reference signal redundancy purposes, as will be discussed below in more detail.

Further, with continuing reference to FIG. 6, the first higher frequency reference signal generation module 154(1) also includes a second higher frequency signal detector 170(2) coupled to a second higher frequency signal generation module input 172(2), which is coupled to the second communications medium 161(2). The second higher frequency signal detector 170(2) is configured to detect the second reference signal 124(2) provided by the second reference signal generation module 122(2). The second higher frequency signal detector 170(2) is also configured to provide a second higher frequency detection output 174(2) representing a detection state of the second reference signal 124(2) provided by the second reference signal generation module 122(2). In this manner, the control system 140 can determine if the second reference signal 124(2) is being received by the first reference signal generation module 122(1) from the second reference signal generation module 122(2), as will be discussed below in more detail.

With continuing reference to FIG. 6, a first higher frequency signal switch 176(1) is provided. The first higher frequency signal switch 176(1) is configured to receive the first master reference signal 124(1) from the first reference signal generation module 122(1) on the first higher frequency signal generation module input 172(1) on a first input 178(1). The first higher frequency signal switch 176(1) is also configured to receive the second reference signal 124(2) from the second reference signal generation module 122(2) on the second higher frequency signal generation module input 172(2) on a second input 178(2). The first higher frequency signal switch 176(1) is also configured to receive a first higher frequency signal switch control input 180(1) from the control system 140 representing the detection state of the first master reference signal 124(1) detected by the first higher frequency signal detector 170(1) and the detection state of the second reference signal 124(2) detected by the second higher frequency signal detector 170(2).

With continuing reference to FIG. 6, the first higher frequency signal switch 176(1) is further configured to provide the first master reference signal 124(1) as a first higher frequency reference signal output 182(1), based on the first higher frequency signal switch control input 180(1) representing detection of the first master reference signal 124(1) provided by the first reference signal generation module 122(1) by the first higher frequency signal detector 170(1). However, if the first higher frequency signal detector 170(1) detects failure in the first master reference signal 124(1) being received in the first higher frequency signal generation module input 172(1), the first higher frequency signal switch 176(1) is configured to provide the second reference signal 124(2) from the second higher frequency signal generation module input 172(2) as the first higher frequency reference signal output 182(1). In this manner, the first higher frequency signal switch 176(1) is configured to provide either the first master reference signal 124(1) or the second reference signal 124(2) to the first higher frequency reference signal output 182(1) in a redundant manner based on detection failures in either the first master reference signal 124(1) or the second reference signal 124(2). Note that in FIG. 6, the first higher frequency signal switch 176(1) is shown as being switched providing the second reference signal 124(2) from the second higher frequency signal generation module input 172(2) as the first higher frequency reference signal output 182(1), because the second oscillator 126(2) is master oscillator.

With continuing reference to FIG. 6, the first higher frequency reference signal output 182(1) from the first higher frequency reference signal generation module 154(1) could be provided directly to DAS components to provide either the first master reference signal 124(1) or second reference signal 124(2) to the DAS components. However, in this non-limiting example, the first higher frequency reference signal output 182(1) is coupled to optional first and second phase-locked-loop (PLL) modules 184(1), 184(2). For example, the first and second PLL modules 184(1), 184(2) may be provided to phase-lock the received first master reference signal 124(1) or second reference signal 124(2) on the first higher frequency reference signal output 182(1) to the first master reference signal 124(1) or second reference signal 124(2). Further, although two PLL modules, the first and second PLL modules 184(1), 184(2) are shown in FIG. 6 by use of the three-state first PLL signal switch 194(1), only one PLL module may also be provided as another option, where the first PLL signal switch 194(1) could be provided as a two-state switch.

With continuing reference to FIG. 6, the first PLL module 184(1) is configured to receive the first higher frequency reference signal output 182(1), and generate a higher frequency reference signal based on either the first master reference signal 124(1) or second reference signal 124(2) as a first PLL higher frequency reference signal 186(1) on a first PLL module output 188(1). Similarly, the second PLL module 184(2) is configured to receive the first higher frequency reference signal output 182(1), and generate a higher frequency reference signal based on either the first master reference signal 124(1) or second reference signal 124(2) as a second PLL higher frequency reference signal 186(2) on a second PLL module output 188(2). First and second PLL detectors 190(1), 190(2) are provided that are each coupled to respective first and second PLL module outputs 188(1), 188(2).

The first PLL detector 190(1) is configured to detect the first PLL higher frequency reference signal 186(1) generated by the first PLL module 184(1). The first PLL detector 190(1) is also configured to provide a first PLL higher frequency detection output 192(1) to the control system 140 representing a detection state of the first PLL higher frequency reference signal 186(1) generated by the first PLL module 184(1). The second PLL detector 190(2) is configured to detect the second PLL higher frequency reference signal 186(2) generated by the second PLL module 184(2). The second PLL detector 190(2) is also configured to provide a second PLL higher frequency detection output 192(2) to the control system 140 representing a detection state of the second PLL higher frequency reference signal 186(2) generated by the second PLL module 184(2). In this manner, the control system 140 can detect if the first and second PLL higher frequency reference signals 186(1), 186(2) are being generated from the first and second PLL modules 184(1), 184(2), respectively.

With continuing reference to FIG. 6, the first higher frequency reference signal generation module 154(1) also includes a first PLL signal switch 194(1) to switch either the first PLL higher frequency reference signal 186(1) or the second PLL higher frequency reference signal 186(2) as the first higher frequency reference signal 152(1) generated by the first higher frequency reference signal generation module 154(1). In this regard, the first PLL signal switch 194(1) is configured to receive the first PLL module output 188(1) as a first input 196(1). The first PLL signal switch 194(1) is also configured to receive the second PLL module output 188(2) as a second input 196(2). The first PLL signal switch 194(1) is also configured to receive a first PLL module control input 198(1) from the control system 140 representing the detection state of the first PLL higher frequency reference signal 186(1) provided by the first PLL module 184(1) detected by the first PLL detector 190(1) and the detection state of the second PLL higher frequency reference signal 186(2) provided by the second PLL module 184(2) detected by the second PLL detector 190(2).

With continuing reference to FIG. 6, the first PLL signal switch 194(1) is configured to switch the first PLL higher frequency reference signal 186(1) on a first higher frequency reference signal output 200(1), based on the first PLL module control input 198(1) representing detection of the first PLL higher frequency reference signal 186(1) generated by the first PLL module 184(1) by the first PLL detector 190(1). However, if the first PLL detector 190(1) does not detect the first PLL higher frequency reference signal 186(1) generated by the first PLL module 184(1), the first PLL signal switch 194(1) is configured to switch the second PLL higher frequency reference signal 186(2) on the first higher frequency reference signal output 200(1) based on the first PLL module control input 198(1) representing detection failure of the first PLL higher frequency reference signal 186(1). The reverse can also be provided. If the second PLL detector 190(2) does not detect the second PLL higher frequency reference signal 186(2) generated by the second PLL module 184(2), the first PLL signal switch 194(1) is configured to switch the first PLL higher frequency reference signal 186(1) on the first higher frequency reference signal output 200(1) based on the second PLL module control input 198(2) representing detection failure of the second PLL higher frequency reference signal 186(2). In this manner, the first PLL signal switch 194(1) is configured to provide either the first or second PLL higher frequency reference signal 186(1) or 186(2) in a redundant manner based on a failure of the other signal. The control system 140 may be configured to cause the first PLL signal switch 194(1) to select the first PLL higher frequency reference signal 186(1) as a default signal on first higher frequency reference signal output 200(1) if both the first and second PLL higher frequency reference signals 186(1), 186(2) are detected by the first and second PLL detectors 190(1), 190(2), respectively. When the second higher frequency reference signal 152(2) is provided by the second higher frequency reference signal generation module 154(2), the first PLL signal switch 194(1) can be switched to a neutral state to avoid the existence of more than one signal reference (e.g., clock) provided by the reference signal generation circuit 150.

The reference signal generation circuit 150 in FIG. 6 also includes the second higher frequency reference signal generation module 154(2), as discussed above, that contains similar components to the first higher frequency reference signal generation module 154(1) to provide a second higher frequency reference signal 152(2) to provide higher frequency reference signal 152 redundancy. In this regard, with continuing reference to FIG. 6, the second higher frequency reference signal generation module 154(2) includes a third higher frequency signal detector 170(3) coupled to a third higher frequency signal generation module input 172(3), which is coupled to the third communications medium 161(3). The third higher frequency signal detector 170(3) is configured to detect the first master reference signal 124(1) provided by the first reference signal generation module 122(1). The third higher frequency signal detector 170(3) is also configured to provide a third higher frequency detection output 174(3) representing a detection state of the first master reference signal 124(1) provided by the first reference signal generation module 122(1). In this manner, the control system 140 can determine if the first master reference signal 124(1) is being received from the first reference signal generation module 122(1) for master reference signal redundancy purposes, as will be discussed below in more detail.

Further, with continuing reference to FIG. 6, the second higher frequency reference signal generation module 154(2) also includes a fourth higher frequency signal detector 170(4) coupled to a fourth higher frequency signal generation module input 172(4), which is coupled to the fourth communications medium 161(4). The fourth higher frequency signal detector 170(4) is configured to detect the second reference signal 124(2) provided by the second reference signal generation module 122(2). The fourth higher frequency signal detector 170(4) is also configured to provide a fourth higher frequency detection output 174(4) representing a detection state of the second reference signal 124(2) provided by the second reference signal generation module 122(2). In this manner, the control system 140 can determine if the second reference signal 124(2) is being received from the second reference signal generation module 122(2), as will be discussed below in more detail.

With continuing reference to FIG. 6, a second higher frequency signal switch 176(2) is provided. The second higher frequency signal switch 176(2) is configured to receive the first master reference signal 124(1) from the first reference signal generation module 122(1) on the third higher frequency signal generation module input 172(3) on a first input 178(3). The second higher frequency signal switch 176(2) is also configured to receive the second reference signal 124(2) from the second reference signal generation module 122(2) on the fourth higher frequency signal generation module input 172(4) on a second input 178(4). The second higher frequency signal switch 176(2) is also configured to receive a second higher frequency signal switch control input 180(2) from the control system 140 representing the detection state of the first master reference signal 124(1) detected by the third higher frequency signal detector 170(3) and the detection state of the second reference signal 124(2) detected by the fourth higher frequency signal detector 170(4).

With continuing reference to FIG. 6, the second higher frequency signal switch 176(2) is further configured to provide the first master reference signal 124(1) as a second higher frequency reference signal output 182(2), based on the second higher frequency signal switch control input 180(2) representing detection of the first master reference signal 124(1) provided by the first reference signal generation module 122(1) by the third higher frequency signal detector 170(3). However, if the third higher frequency signal detector 170(3) detects failure in the first master reference signal 124(1) being received in the third higher frequency module input 172(3), the second higher frequency signal switch 176(2) is configured to provide the second reference signal 124(2) as the second higher frequency reference signal output 182(2). In this manner, the second higher frequency signal switch 176(2) is configured to provide either the first master reference signal 124(1) or second reference signal 124(2) to the second higher frequency reference signal output 182(2) in a redundant manner based on detection failures in either the first master reference signal 124(1) or second reference signal 124(2).

With continuing reference to FIG. 6, the second higher frequency reference signal output 182(2) from the second higher frequency reference signal generation module 154(2) could be provided directly to DAS components to provide either the first master reference signal 124(1) or second reference signal 124(2) to the DAS components. However, in this non-limiting example, the second higher frequency reference signal output 182(2) is coupled to optional third and fourth phase-locked-loop (PLL) modules 184(3), 184(4). For example, the third and fourth PLL modules 184(3), 184(4) may be provided to phase-lock the received first master reference signal 124(1) or second reference signal 124(2) on the second higher frequency reference signal output 182(2) to the first master reference signal 124(1) or second reference signal 124(2). Although two PLL modules, the third and fourth PLL modules 184(3), 184(4) are provided, only one PLL module may also be provided as an option.

With continuing reference to FIG. 6, the third PLL module 184(3) is configured to receive the second higher frequency reference signal output 182(2), and generate a higher frequency reference signal based on either the first master reference signal 124(1) or second reference signal 124(2) as a third PLL higher frequency reference signal 186(3) on a third PLL module output 188(3). Similarly, the fourth PLL module 184(4) is configured to receive the second higher frequency reference signal output 182(2), and generate a higher frequency reference signal based on either the first master reference signal 124(1) or second reference signal 124(2) as a fourth PLL higher frequency reference signal 186(4) on a fourth PLL module output 188(4). Third and fourth PLL detectors 190(3), 190(4) are provided that are each coupled to respective third and fourth PLL module outputs 188(3), 188(4).

The third PLL detector 190(3) is configured to detect the third PLL higher frequency reference signal 186(3) generated by the third PLL module 184(3). The third PLL detector 190(3) is also configured to provide a third PLL higher frequency detection output 192(3) to the control system 140 representing a detection state of the third PLL higher frequency reference signal 186(3) generated by the third PLL module 184(3). The fourth PLL detector 190(4) is configured to detect the fourth PLL higher frequency reference signal 186(4) generated by the fourth PLL module 184(4). The fourth PLL detector 190(4) is also configured to provide a fourth PLL higher frequency detection output 192(4) to the control system 140 representing a detection state of the fourth PLL higher frequency reference signal 186(4) generated by the fourth PLL module 184(4). In this manner, the control system 140 can detect if the third and fourth PLL higher frequency reference signals 186(3), 186(4) are being generated from the third and fourth PLL modules 184(3), 184(4), respectively.

The second higher frequency reference signal generation module 154(2) also includes a second PLL signal switch 194(2) to switch either the third PLL higher frequency reference signal 186(3) or the fourth PLL higher frequency reference signal 186(4) as the higher frequency reference signal 152(2) generated by the second higher frequency reference signal generation module 154(2). In this regard, the second PLL signal switch 194(2) is configured to receive the third PLL module output 188(3) as a first input 196(3). The second PLL signal switch 194(2) is also configured to receive the fourth PLL module output 188(4) as a second input 196(4). The second PLL signal switch 194(2) is also configured to receive a second PLL module control input 198(2) from the control system 140 representing the detection state of the third PLL higher frequency reference signal 186(3) provided by the third PLL module 184(3) detected by the third PLL detector 190(3) and the detection state of the fourth PLL higher frequency reference signal 186(4) provided by the fourth PLL module 184(4) detected by the fourth PLL detector 190(4).

With continuing reference to FIG. 6, the second PLL signal switch 194(2) is configured to switch the third PLL higher frequency reference signal 186(3) on a second higher frequency reference signal output 200(2), based on the second PLL module control input 198(2) representing detection of the third PLL higher frequency reference signal 186(3) generated by the third PLL module 184(3) by the third PLL detector 190(3). However, if the third PLL detector 190(3) does not detect the third PLL higher frequency reference signal 186(3) generated by the third PLL module 184(3), the second PLL signal switch 194(2) is configured to switch the fourth PLL higher frequency reference signal 186(4) on the second higher frequency reference signal output 200(2) based on the second PLL module control input 198(2) representing detection failure of the third PLL higher frequency reference signal 186(3). The reverse can also be provided. If the fourth PLL detector 190(4) does not detect the fourth PLL higher frequency reference signal 186(4) generated by the fourth PLL module 184(4), the second PLL signal switch 194(2) can be configured to switch the third PLL higher frequency reference signal 186(3) on the second higher frequency reference signal output 200(2) based on the second PLL module control input 198(2) representing detection failure of the fourth PLL higher frequency reference signal 186(4). In this manner, the second PLL signal switch 194(2) is configured to provide either the third or fourth PLL higher frequency reference signal 186(3) or 186(4) in a redundant manner based on a failure of the other signal. The control system 140 may be configured to cause the second PLL signal switch 194(2) to select the third PLL higher frequency reference signal 186(3) as a default signal on the second higher frequency reference signal output 200(2) if both the third and fourth PLL higher frequency reference signals 186(3), 186(4) are detected by the third and fourth PLL detectors 190(3), 190(4), respectively. The control system 140 is configured to set the second PLL signal switch 194(2) to a third, neutral state when the first master reference signal 124(1) is provided by the first higher frequency reference signal generation module 154(1).

Figure 7A:
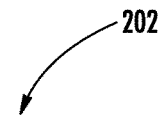

Failures and recovery actions for the first, second, third, and fourth communications mediums 161(1)-161(4), respectively, are represented in the exemplary failure and recovery action table 202 in FIG. 7A as failure numbers F-4(1)-F-4(4), respectively. As shown therein, failure number F-4(1) in FIG. 7A relates to a failure of the first communications medium 161(1) in the reference signal generation circuit 150 in FIG. 6, which can be detected by the first higher frequency signal detector 170(1). In this failure scenario, if the second detector 162(2) in the first reference signal generation module 122(1) detects the first master reference signal 124(1) in the first reference signal generation module 122 (1), the third communications medium 161(3) can be employed to provide the first master reference signal 124(1) to the second higher frequency reference signal generation module 154(2) as the recovery action. In this regard, the recovery action provided is to provide the first input 178(3) to be switched by the second higher frequency signal switch 176(2) to provide the first master reference signal 124(1) to the second higher frequency reference signal output 182(2) in the second higher frequency reference signal generation module 154(2). The recovery action may be controlled by the control system 140 as previously discussed.

Failure number F-4(2) in FIG. 7A relates to a failure of the second communications medium 161(2) in the reference signal generation circuit 150 in FIG. 6, which can be detected by the second higher frequency signal detector 170(2). In this failure scenario, if the first detector 162(1) in the first reference signal generation module 122(1) detects the first master reference signal 124(1) in the first reference signal generation module 122(1), the first communications medium 161(1) can be employed to provide the first master reference signal 124(1) to the first higher frequency reference signal generation module 154(1) as the recovery action. In this regard, the recovery action provided is to provide the first input 178(1) to be switched by the first higher frequency signal switch 176(1) to provide the first master reference signal 124(1) to the first higher frequency reference signal output 182(1) in the first higher frequency reference signal generation module 154(1). The recovery action may be controlled by the control system 140 as previously discussed.

Failure number F-4(3) in FIG. 7A relates to a failure of the third communications medium 161(3) in the reference signal generation circuit 150 in FIG. 6, which can be detected by the third higher frequency signal detector 170(3). In this failure scenario, if the second detector 166(2) in the second reference signal generation module 122(2) detects the second reference signal 124(2) in the second reference signal generation module 122(2), the fourth communications medium 161(4) can be employed to provide the second reference signal 124(2) to the second higher frequency reference signal generation module 154(2) as the recovery action. In this regard, the recovery action provided is to provide the second input 178(4) to be switched by the second higher frequency signal switch 176(2) to provide the second reference signal 124(2) to the second higher frequency reference signal output 182(2) in the second higher frequency reference signal generation module 154(2). The recovery action may be controlled by the control system 140 as previously discussed.

Failure number F-4(4) in FIG. 7A relates to a failure of the fourth communications medium 161(4) in the reference signal generation circuit 150 in FIG. 6, which can be detected by the fourth higher frequency signal detector 170(4). In this failure scenario, if the first detector 166(1) in the second reference signal generation module 122(2) detects the second reference signal 124(2) in the second reference signal generation module 122(2), the third communications medium 161(3) can be employed to provide the second reference signal 124(2) to the first higher frequency reference signal generation module 154(1) as the recovery action. In this regard, the recovery action provided is to provide the second input 178(2) to be switched by the first higher frequency signal switch 176(1) to provide the second reference signal 124(2) to the first higher frequency reference signal output 182(1) in the first higher frequency reference signal generation module 154(1). The recovery action may be controlled by the control system 140 as previously discussed.

Failure number F-5(1) in the failure and recovery action table 204 in FIG. 7B relates to a failure of the first PLL module 184(1) in the reference signal generation circuit 150 in FIG. 6, which can be detected by the first PLL detector 190(1). In this failure scenario, if the second PLL detector 190(2) in the first higher frequency reference signal generation module 154(1) detects the second PLL module output 188(2) in the first higher frequency reference signal generation module 154(1), the second PLL module output 188(2) can be provided as the first higher frequency reference signal 152(1) as the recovery action. In this regard, the second input 196(2) can be switched by the first PLL higher frequency reference signal switch 194(1) to provide the second PLL higher frequency reference signal 186(2) to the first higher frequency reference signal output 200(1) to provide the first higher frequency reference signal 152(1). The recovery action may be controlled by the control system 140 as previously discussed.

Failure number F-5(2) in FIG. 7B relates to a failure of the second PLL module 184(2) in the reference signal generation circuit 150 in FIG. 6, which can be detected by the second PLL detector 190(2). In this failure scenario, if the first PLL detector 190(1) in the first higher frequency reference signal generation module 154(1) detects the first PLL module output 188(1) in the first higher frequency reference signal generation module 154(1), the first PLL module output 188(1) can be provided as the first higher frequency reference signal 152(1) as the recovery action. In this regard, the first input 196(1) can be switched by the first PLL higher frequency reference signal switch 194(1) to provide the first PLL higher frequency reference signal 186(1) to the first higher frequency reference signal output 200(1) to provide the first higher frequency reference signal 152(1). The recovery action may be controlled by the control system 140 as previously discussed.

Failure number F-5(3) in FIG. 7B relates to a failure of the third PLL module 184(3) in the reference signal generation circuit 150 in FIG. 6, which can be detected by the third PLL detector 190(3). In this failure scenario, if the fourth PLL detector 190(4) in the second higher frequency reference signal generation module 154(2) detects the fourth PLL module output 188(4) in the second higher frequency reference signal generation module 154(2), the fourth PLL module output 188(4) can be provided as the second higher frequency reference signal 152(2) as the recovery action. In this regard, the second input 196(4) can be switched by the second PLL higher frequency reference signal switch 194(2) to provide the fourth PLL higher frequency reference signal 186(4) to the second higher frequency reference signal output 200(2) to provide the second higher frequency reference signal 152(2). The recovery action may be controlled by the control system 140 as previously discussed.

Failure number F-5(4) in FIG. 7B relates to a failure of the fourth PLL module 184(4) in the reference signal generation circuit 150 in FIG. 6, which can be detected by the fourth PLL detector 190(4). In this failure scenario, if the third PLL detector 190(3) in the second higher frequency reference signal generation module 154(2) detects the third PLL module output 188(3) in the second higher frequency reference signal generation module 154(2), the third PLL module output 188(3) can be provided as the second higher frequency reference signal 152(2) as the recovery action. In this regard, the first input 196(3) can be switched by the second PLL higher frequency reference signal switch 194(2) to provide the third PLL higher frequency reference signal 186(3) to the second higher frequency reference signal output 200(2) to provide the second higher frequency reference signal 152(2). The recovery action may be controlled by the control system 140 as previously discussed.

Failure number F-6(1) in FIG. 7B relates to a failure of both the first and second PLL modules 184(1), 184(2) in the reference signal generation circuit 150 in FIG. 6, which can be detected by the first and second PLL detectors 190(1), 190(2). In this failure scenario, if the second detector 170(2) in the first higher frequency reference signal generation module 154(1) detects the second reference signal 124(2) received from the second reference signal generation module 122(2), the third PLL module output 188(3) can be provided as the second higher frequency reference signal 152(2) as the recovery action. In this regard, the first input 196(3) can be switched by the second PLL signal switch 194(2) to provide the first master reference signal 124(1) as the third PLL higher frequency reference signal 186(3) to the second higher frequency reference signal output 200(2) to provide the second higher frequency reference signal 152(2). The first PLL signal switch 194(1) may also be turned off to prevent the first higher frequency reference signal output 200(1) from providing the first higher frequency reference signal 152(1). These recovery actions may be controlled by the control system 140 as previously discussed.

Failure number F-6(2) in FIG. 7B relates to a failure of both the third and fourth PLL modules 184(3), 184(4) in the reference signal generation circuit 150 in FIG. 6, which can be detected by the third and fourth PLL detectors 190(3), 190(4). In this failure scenario, if the first detector 170(3) in the second higher frequency reference signal generation module 154(2) detects the first master reference signal 124(1) received from the first reference signal generation module 122(1), the second PLL module output 188(2) can be provided as the first higher frequency reference signal 152(1) as the recovery action. In this regard, the second input 196(2) can be switched by the first PLL signal switch 194(1) to provide the second reference signal 124(2) as the second PLL higher frequency reference signal 186(2) to the first higher frequency reference signal output 200(1) to provide the first higher frequency reference signal 152(1). The second PLL signal switch 194(2) may also be turned off to prevent the second higher frequency reference signal output 200(2) from providing the second higher frequency reference signal 152(2). These recovery actions may be controlled by the control system 140 as previously discussed.

Figure 8A:
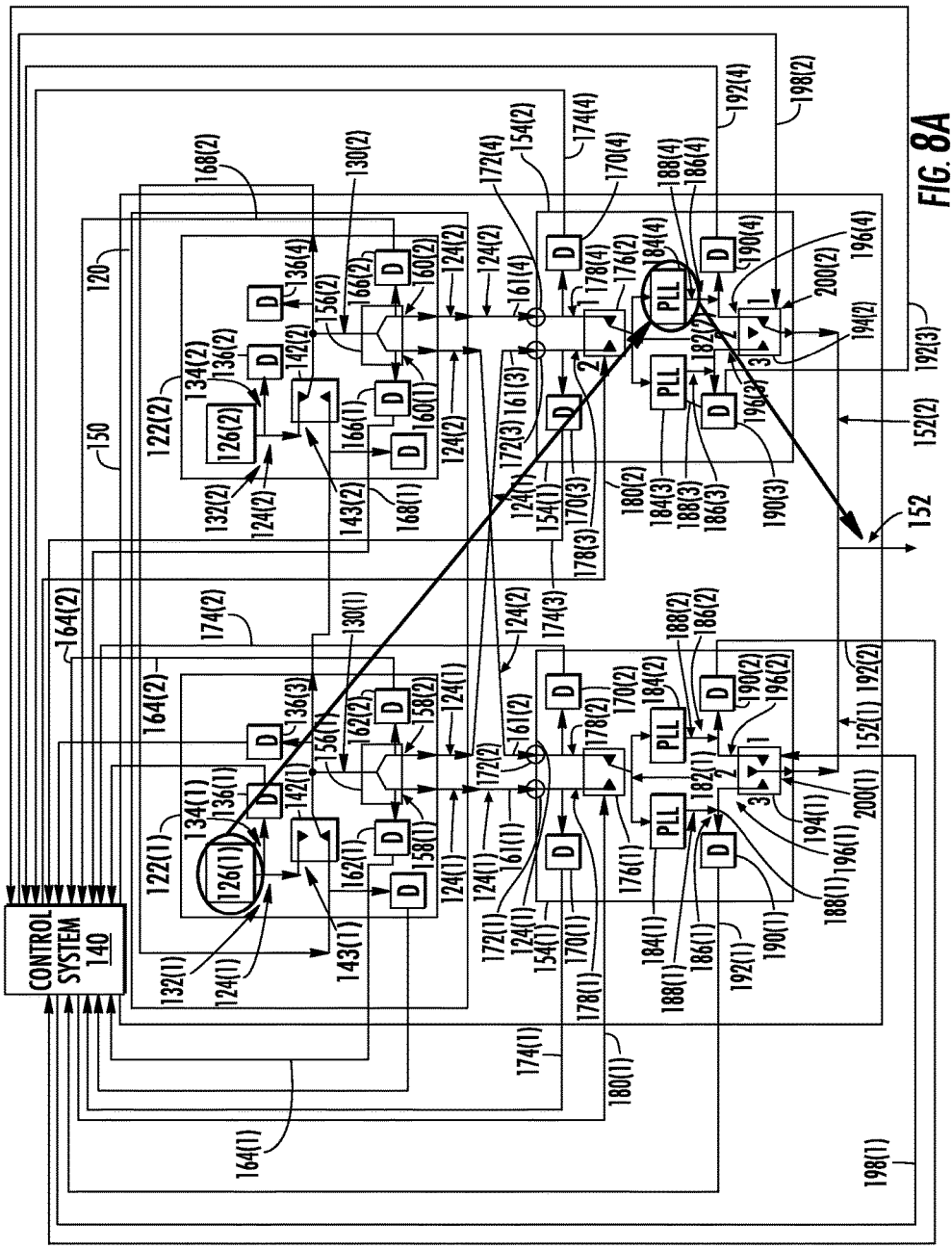
FIGS. 8A-8D illustrate exemplary recovery actions in the reference signal generation circuit in FIG. 6.

FIGS. 8A-8D illustrate further exemplary failure modes and recovery actions for the reference signal generation circuit 150 in FIG. 6. In FIG. 8A, the reference signal generation circuit 150 in FIG. 6 is shown when failure number F-1(2) in FIG. 5 occurs, where the second oscillator 126(2) in the second reference signal generation module 122(2) fails. The second higher frequency signal switch 176(2) of the second higher frequency reference signal generation module 154(2) can be controlled by the control system 140 to select the first input 178(3) to provide the received first master reference signal 124(1) received from the first reference signal generation module 122(1) over third communications medium 161(3) as the second higher frequency reference signal output 182(2). The first master reference signal 124(1) provided as the second higher frequency reference signal output 182(2) is provided as the second higher frequency reference signal 152(2) generated by the second higher frequency signal generation module 154(2).

Figure 8B:
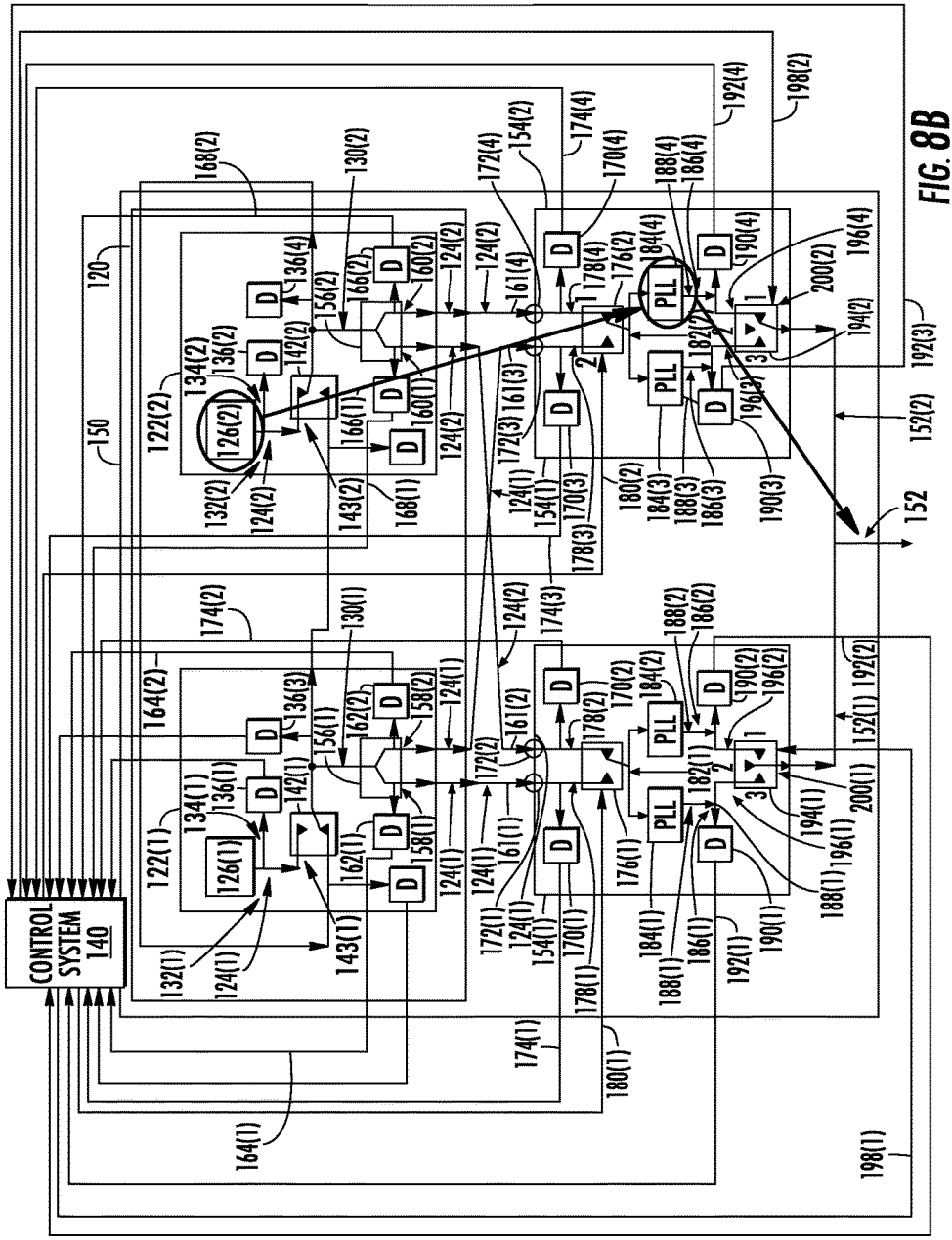

As another example, in FIG. 8B, the reference signal generation circuit 150 in FIG. 6 is shown when failure number F-5(4) in FIG. 7B occurs, where the fourth PLL module 184(4) in the second higher frequency reference signal generation module 154(2) fails. As discussed above, in this failure scenario, if the third PLL detector 190(3) in the second higher frequency reference signal generation module 154(2) detects the third PLL module output 188(3) in the second higher frequency reference signal generation module 154(2), the third PLL module output 188(3) can be provided as the second higher frequency reference signal 152(2) as the recovery action. In this regard, the first input 196(3) can be switched by the second PLL signal switch 194(2) to provide the third PLL higher frequency reference signal 186(3) to the second higher frequency reference signal output 200(2) to provide the second higher frequency reference signal 152(2). The recovery action may be controlled by the control system 140 as previously discussed.

Figure 8C:
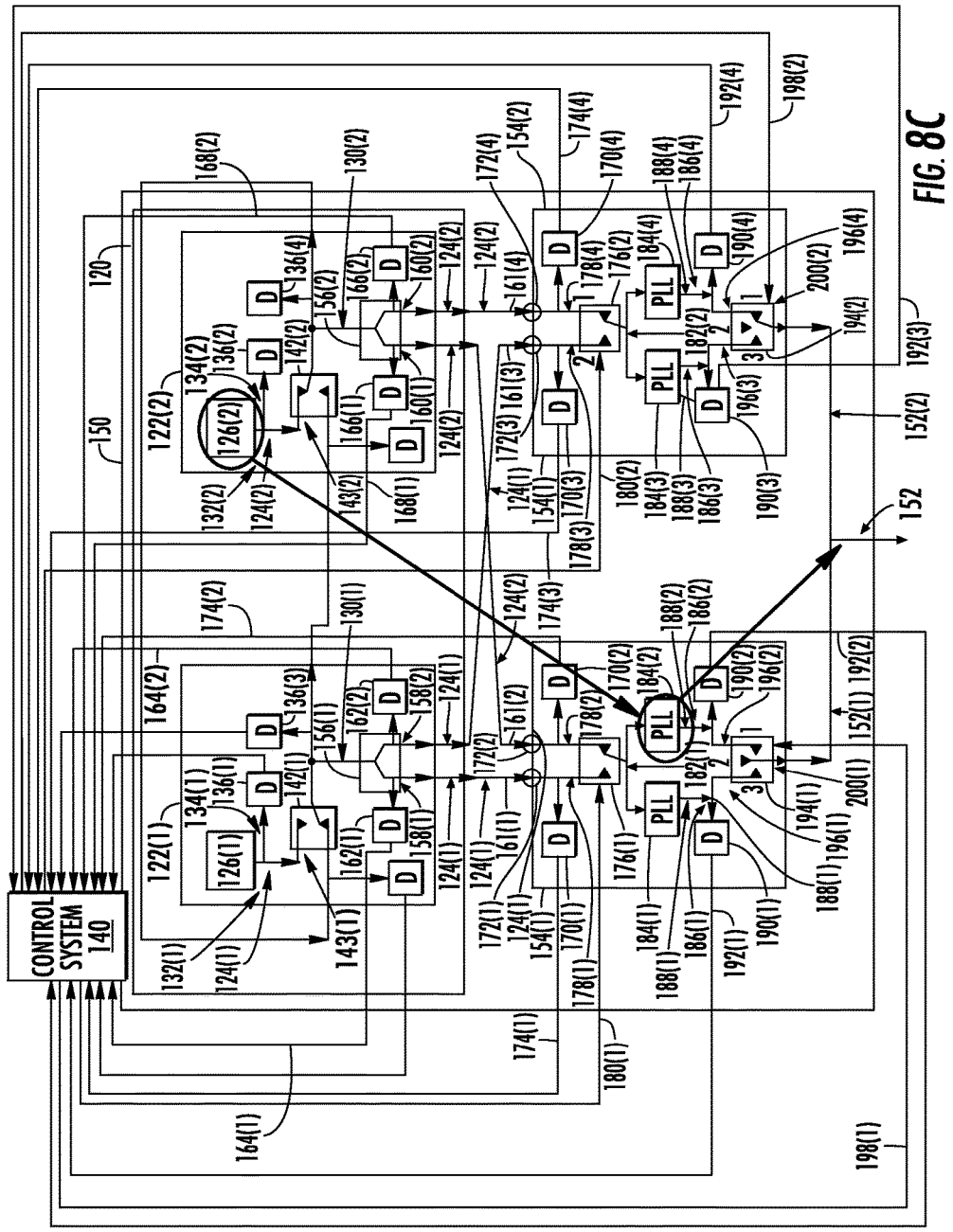

As another example, in FIG. 8C, the reference signal generation circuit 150 in FIG. 6 is shown when failure number F-6(2) in FIG. 7B occurs, where both the third and fourth PLL modules 184(3), 184(4) fail. As discussed above, in this failure scenario, if the first detector 170(3) in the second higher frequency reference signal generation module 154(2) detects the first master reference signal 124(1) received from the first reference signal generation module 122(1), the second PLL module output 188(2) can be provided as the first higher frequency reference signal 152(1) as the recovery action. In this regard, the second input 196(2) can be switched by the first PLL signal switch 194(1) to provide the second reference signal 124(2) as the second PLL higher frequency reference signal 186(2) to the first higher frequency reference signal output 200(1) to provide the first higher frequency reference signal 152(1). The second PLL signal switch 194(2) may also be turned off to prevent the second higher frequency reference signal output 200(2) from providing the second higher frequency reference signal 152(2). These recovery actions may be controlled by the control system 140 as previously discussed.

Figure 8D:
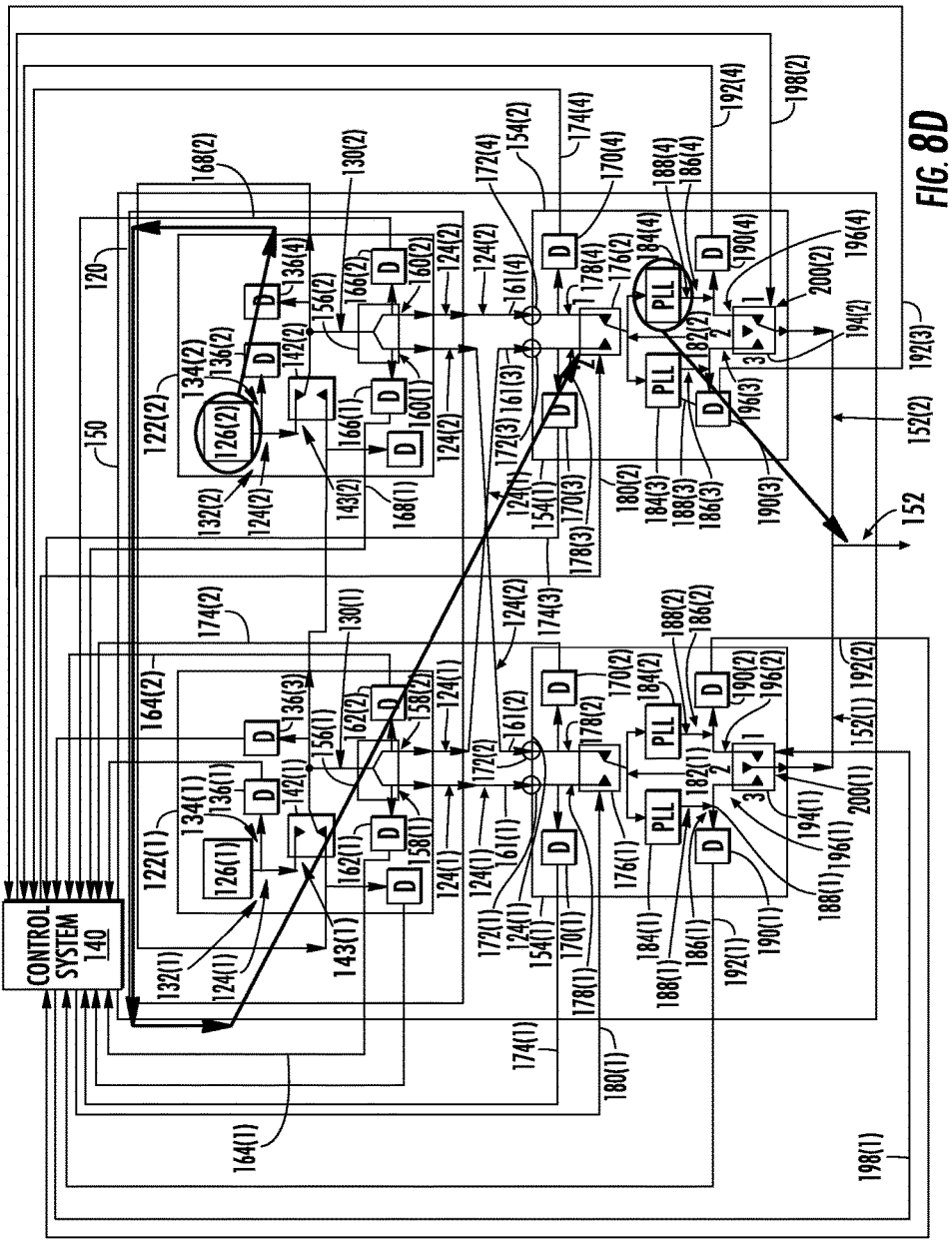

As another example, in FIG. 8D, the reference signal generation circuit 150 in FIG. 6 is shown when failure number F-4(4) in FIG. 7A occurs, where the fourth communications medium 161(4) fails. As discussed above, in this failure scenario, if the first detector 166(1) in the second reference signal generation module 122(2) detects the second reference signal 124(2) in the second reference signal generation module 122(2), the third communications medium 161(3) can be employed to provide the second reference signal 124(2) to the first higher frequency reference signal generation module 154(1) as the recovery action. In this regard, the recovery action provided is to provide the second input 196(2) to be switched by the first higher frequency signal switch 176(1) to provide the second reference signal 124(2) to the first higher frequency reference signal output 182(1) in the first higher frequency reference signal generation module 154(1). The recovery action may be controlled by the control system 140 as previously discussed.

Figure 9:
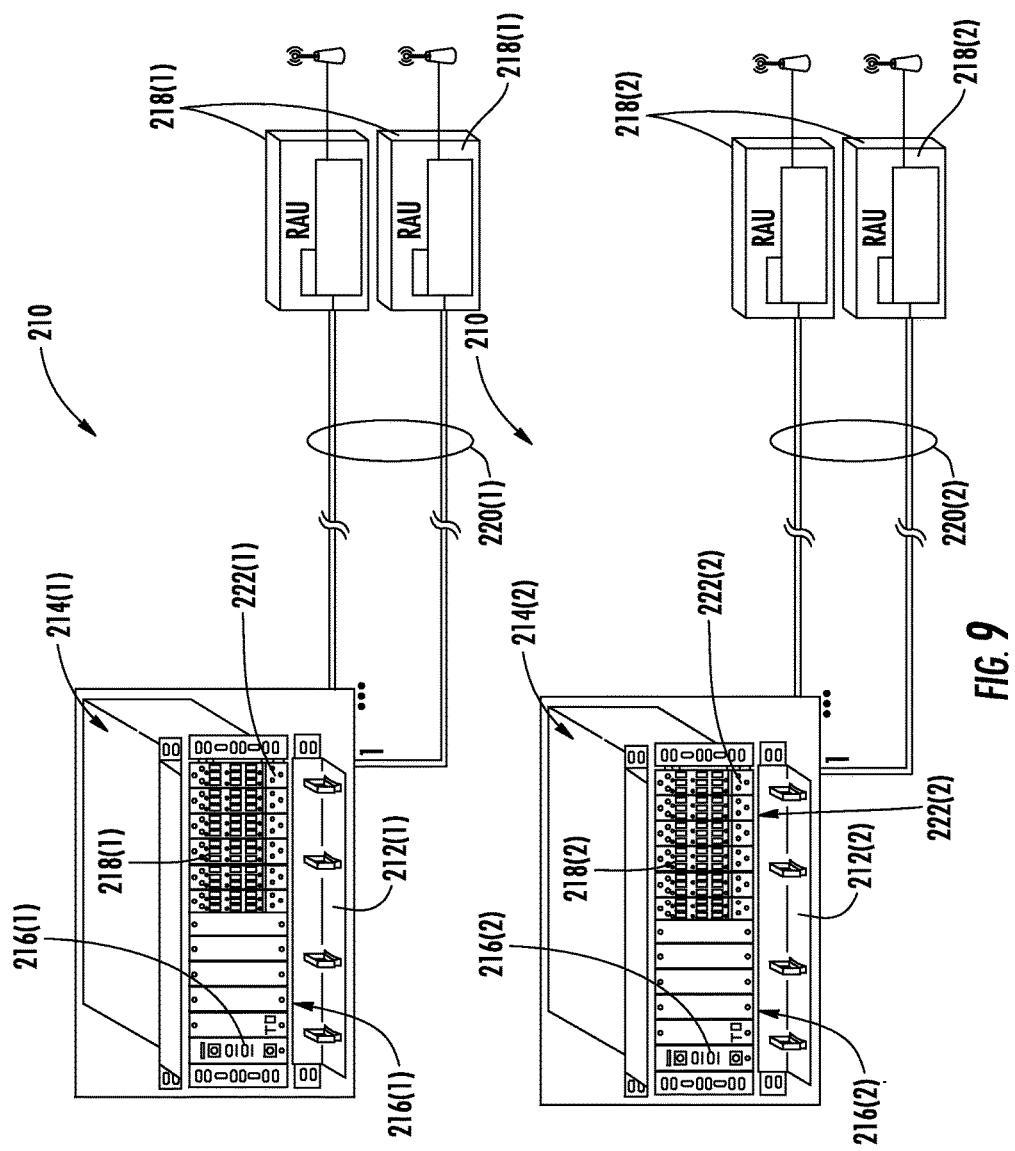
FIG. 9 is a schematic diagram of an exemplary DAS that includes a plurality of central unit chassis providing central units configured in a master slave configuration, wherein the reference signal generation modules are distributed in multiple central unit chassis.

The reference signal generation modules in the reference signal generation circuit 150 in FIG. 6 may also be provided in a single DAS component or distributed among different DAS components. In this regard, FIG. 9 is a schematic diagram of an exemplary DAS 210 that includes a plurality of central unit chassis 212(1), 212(2) each containing central units 214(1), 214(2). The central unit 214(2) may be configured as a slave master unit with the central unit 214(1) being configured as a master unit as an example. Each central unit 214(1), 214(2) may have one or more respective radio units 216(1), 216(2) that are configured to receive downlink communications signals from a component, such as a base station, external to the central unit chassis 212(1), 212(4), and receive uplink communication signals from the remote antenna units 218(1), 218(2) over the communications medium 220(1), 220(2). The DAS 210 may be an optical fiber-based DAS, wherein the communications medium 220(1), 220(2) include optical fiber. In this regard, the central units 214(1), 214(2) may include optical interface modules 222(1), 222(2) that perform electrical to optical signal conversions for downlink communications signals, and optical to electrical signal conversions for uplink communications signals. It may be desired to provide the master reference signals 124 or the higher frequency reference signals 152 described above to different components of the DAS 210. For example, the reference signal generation modules 122 may be included in a radio unit 216 to provide the master reference signals 124 to radio units 216, and the higher frequency reference signal generation modules 154 may be provided in an optical interface module 222 within the same central unit 214 or different central unit 214 to provide the higher frequency reference signal 152 to the optical interface modules 222.

Figure 10:
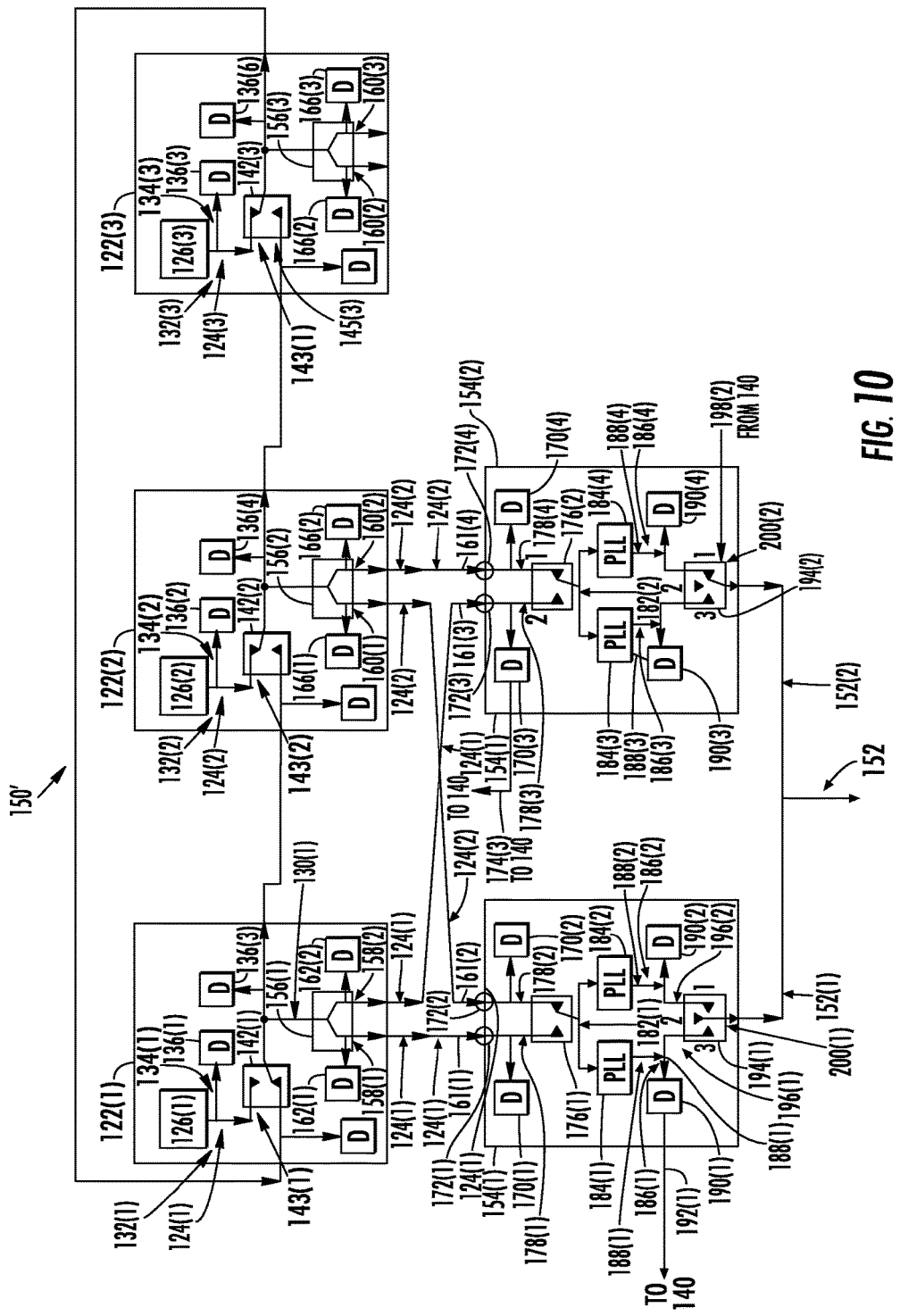
FIG. 10 is a schematic diagram of another exemplary reference signal generation circuit for generating a reference signal in a DAS, wherein the reference signal generation circuit includes reference signal generation modules like those provided in FIG. 6 that are distributed over multiple central unit chassis for master reference signal generation redundancy, and the exemplary higher frequency reference signal generation modules in FIG. 6 interconnected to the reference signal generation modules.

In this regard, FIG. 10 is a schematic diagram of another exemplary reference signal generation circuit 150' that can be provided in the DAS 210 in FIG. 9. Like components in the reference signal generation circuit 150' in FIG. 10 and the components in the reference signal generation circuit 150 in FIG. 6 are labeled with common element numbers in FIG. 10, and thus will not be re-described. The reference signal generation circuit 150' includes three reference signal generation modules, 122(1)-122(3) for additional master reference signal 124 redundancy, but any number of reference signal generation modules 122 could be provided. The reference signal generation circuit 150' also includes the higher frequency reference signal generation modules 154(1), 154(2) for higher frequency reference signal 154 generation redundancy, but any number of higher frequency reference signal generation modules 154 could be provided. The three (3) reference signal generation modules, 122(1)-122(3) and two (2) higher frequency reference signal generation modules 154(1), 154(2) could be distributed among any DAS components or different DAS components in the DAS 210 (shown in FIG. 9).

With continuing reference to FIG. 10, the third reference signal generation module 122(3) is also similarly configured with similar components as the first and second reference signal generation modules 122(1), 122(2) described above, to facilitate master reference signal generation redundancy. In this regard, as discussed above, the third reference signal generation module 122(3) includes the third master oscillator 126(3). The third master oscillator 126(3) is configured to generate a third reference signal 132(3) as the third master reference signal 124(3) at a third master oscillator output 134(3). The third reference signal generation module 122(3) also includes a third detector 136(3) that is coupled to the third master oscillator output 134(3). The third detector 136(3) is configured to detect the third master reference signal 124(3) generated by the third master oscillator 126(3) and provide a third detection output 138(3) representing a detection state of the third master reference signal 124(3). In this manner, the third detection output 138(3) can be received and analyzed by the control system 140 to determine if the third master reference signal 124(3) is being generated by the third master oscillator 126(3). If the third master reference signal 124(3) is not being generated by the third master oscillator 126(3), the control system 140 can cause a third reference signal switch 142(3) to provide the received second reference signal 124(2) received from the second reference signal generation module 122(2) over the second communications medium 128(2) on the second reference signal generation module output 130(2) to provide master reference signal generation redundancy.

In this regard, with continuing reference to FIG. 10, the third reference signal switch 142(3) is configured to receive the third master reference signal 124(3) from the third master oscillator 126(3) as a first input 143(3). The third reference signal switch 142(3) is also configured to receive the second reference signal 124(2) from the second reference signal generation module 122(2) as a second input 145(3). The third reference signal switch 142(3) is also configured to receive a third switch control input 144(3)

representing the detection state of the third master reference signal 124(3) detected by the third detector 136(3). The third reference signal switch 142(3) is configured to switch the third master reference signal 124(3) to the third master reference signal generation module output 130(3) based on the third switch control input 144(3) representing detection of the third master reference signal 124(3) by the third detector 136(3). The control system 140 is configured to provide the third switch control input 144(3) representing detection of the third master reference signal 124(3) by the third detector 136(3) additionally if the second detector 136(2) in the second reference signal generation module 122(2) does not detect the second reference signal 124(2). As discussed above, in this scenario, the control system 140 provides the third switch control input 144(3) to provide for the third reference signal generation module 122(3) to provide the third master reference signal 124(3) as the third master reference signal generation module output 130(3).

However, if the control system 140 determines that the third master reference signal 124(3) was not detected by the third detector 136(3), meaning that failure has occurred in the third master oscillator 126(3) or other issue preventing the third master reference signal 124(3) from being detected, the third reference signal switch 142(3) is configured to switch the received second reference signal 124(2) from the second communications medium 128(2) to the third master reference signal generation module output 130(3) based on the third switch control input 144(3) representing detection failure of the third master reference signal 124(3) by the third detector 136(3). As discussed above, the control system 140 controls this decision by generating the first, second, and third switch control inputs 144(1)-144(3) to control which master reference signal among the first, second, and third master reference signals 124(1)-124(3) is to be provided on the first, second, and third master reference signal generation module outputs 130(1)-130(3), respectively. Thus, in one embodiment, the control system 140 should be configured so that first, second, and third switch control inputs 144(1)-144(3) always cause the first, second, and third reference signal switches 142(1)-142(3) to both switch either the first master reference signal 124(1), the second reference signal 124(2), or the third master reference signal 124(3) on the first, second, and third master reference signal generation module outputs 130(1)-130(3), respectively.

In this regard, with continuing reference to FIG. 10, additional detectors can be provided in the third reference signal generation module 122(3) as provided in the first and second reference signal generation modules 122(1), 122(2). These additional detectors and related components are illustrated in FIG. 10 with common component numbers to those included in the first and second reference signal generation modules 122(1), 122(2), but with different notations in parenthesis '( )' to signify different instances provided in the third reference signal generation module 122(3). Thus, these components will not be re-described here. The third reference signal generation module 122(3) is configured to provide the third master reference signal 124(3) over a third communications medium 128(3) to the first reference signal generation module 122(1), as opposed to receiving the second reference signal 124(2) from the second reference signal generation module 122(2).

Figure 11:
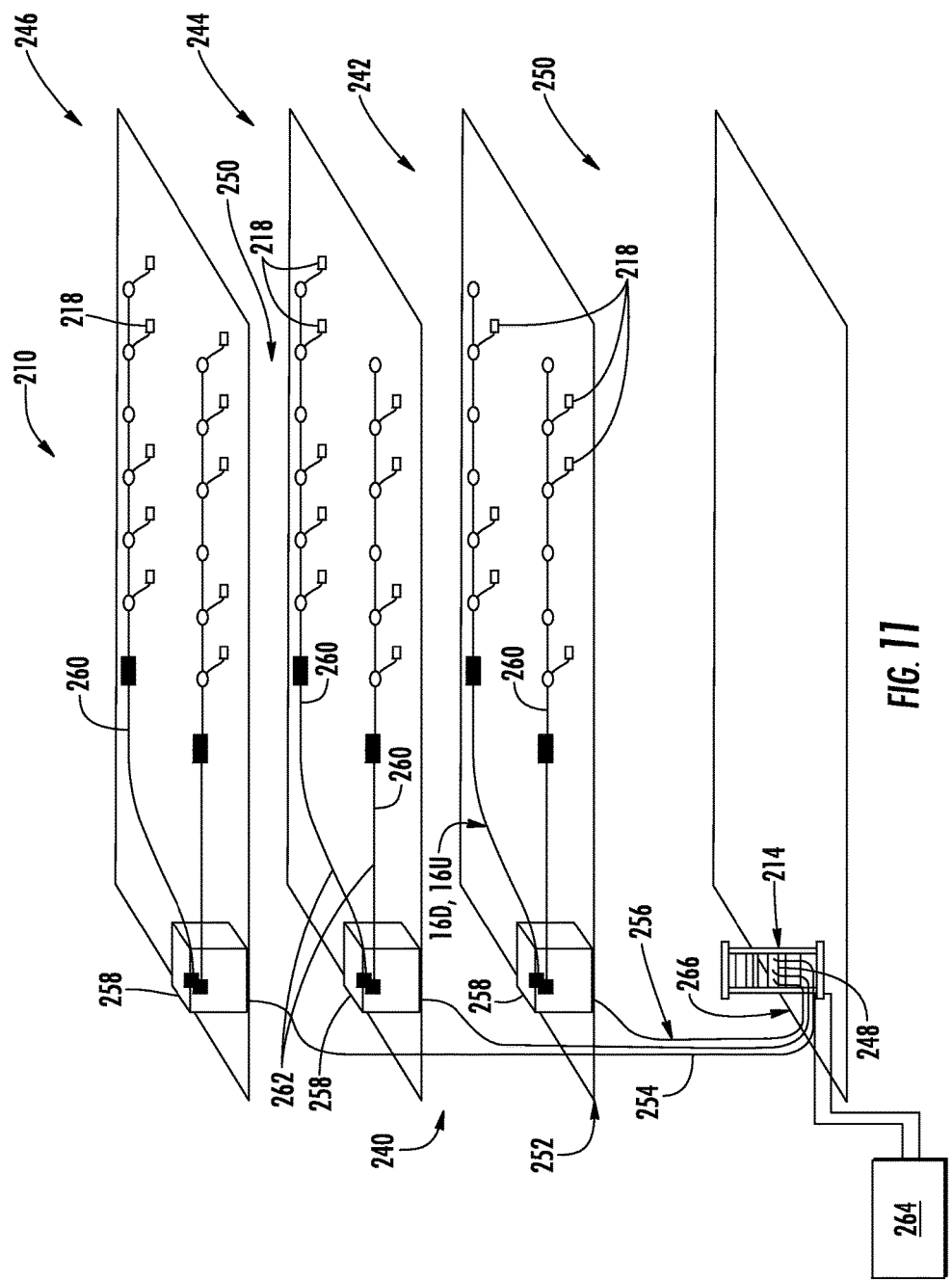
FIG. 11 is a partially schematic cut-away diagram of an exemplary building infrastructure in which the DASs can employ the reference signal generation circuits for providing reference signal generation redundancy disclosed herein.

FIG. 11 is a partially schematic cut-away diagram of an exemplary building infrastructure 240 in which the DAS 210 in FIG. 10 can be provided and that can employ the reference signal generation circuits disclosed herein for providing reference signal generation redundancy. With reference to FIG. 11, the building infrastructure 240 in this embodiment includes a first (ground) floor 242, a second floor 244, and a third floor 246. The floors 242, 244, 246 are serviced by the central unit 214 through a main distribution frame 248 to provide antenna coverage areas 250 in the building infrastructure 240. Only the ceilings of the floors 242, 244, 246 are shown in FIG. 11 for simplicity of illustration. In the example embodiment, a main cable 252 has a number of different sections that facilitate the placement of a large number of remote antenna units 218 in the building infrastructure 240. Each remote antenna unit 218 in turn services its own coverage area in the antenna coverage areas 250. The main cable 252 can include, for example, a riser cable 254 that carries all of the downlink and uplink optical fibers 256 to and from the central unit 214. The riser cable 254 may be routed through an interconnect unit (ICU) 258. The ICU 258 may be provided as part of or separate from the power supply (not shown). The ICU 258 may also be configured to provide power to the remote antenna units 218 via the electrical power line (not shown) provided inside an array cable 260, or tail cable or home-run tether cable as other examples, and distributed with the optical fibers 256 to the remote antenna units 218.

The main cable 252 enables multiple optical fiber cables 262 to be distributed throughout the building infrastructure 240 (e.g., fixed to the ceilings or other support surfaces of each floor 242, 244, 246) to provide the antenna coverage areas 250 for the first, second, and third floors 242, 244, 246. In an example embodiment, the head-end unit 212 is located within the building infrastructure 240 (e.g., in a closet or control room), while in another example embodiment, the central unit 214 may be located outside of the building infrastructure 240 at a remote location. A base station 264, which may be provided by a second party such as a cellular service provider, is connected to the central unit 214 through the duplexed port 266. The base station 264 is any station or signal source that provides the downlink communications signals to the central unit 214 and can return uplink communications signals from the central unit 214.

Figure 12:
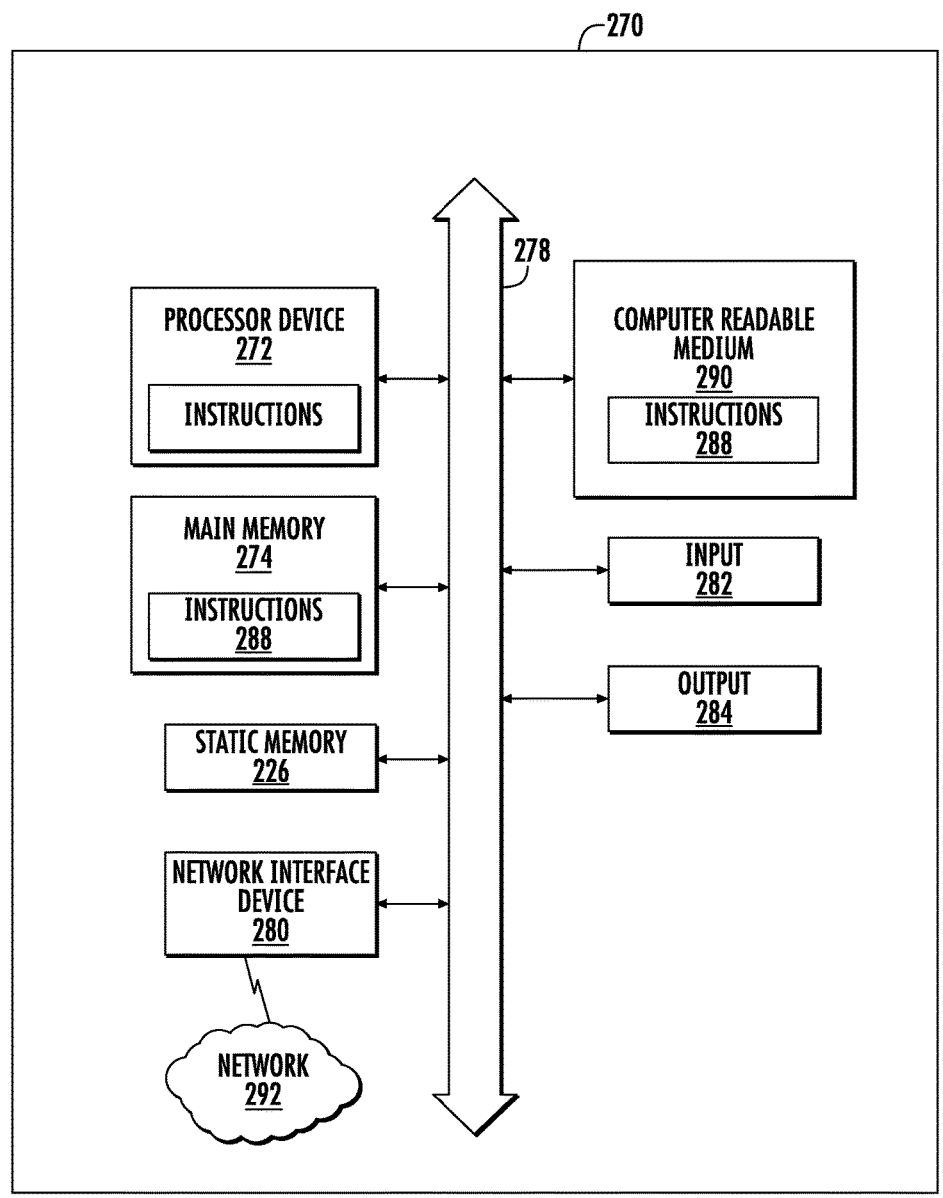
FIG. 12 is a schematic diagram of a generalized representation of an exemplary controller that can be included in any central unit, remote units, wireless client devices, and/or any other components of a DAS to provide control of the signal generation modules disclosed herein to provide for reference signal generation redundancy, wherein the exemplary computer system is adapted to execute instructions from an exemplary computer readable medium.

FIG. 12 is a schematic diagram representation of additional detail illustrating components that could be employed in the control system 140 that controls the reference signal generation circuits disclosed herein, if the control system 140 is adapted to execute instructions from a computer-readable medium to perform any of the functions or processing described herein. In this regard, the control system 140 may include a computer system 270 within which a set of instructions for performing any one or more of the location services discussed herein may be executed. The computer system 270 may be connected (e.g., networked) to other machines in a LAN, an intranet, an extranet, or the Internet. While only a single device is illustrated, the term "device" shall include any collection of devices that individually or jointly execute a set(s) of instructions to perform any one or more of the methodologies discussed herein. The computer system 270 may be a circuit or circuits included in an electronic board card, such as, a printed circuit board (PCB), a server, a personal computer, a desktop computer, a laptop computer, a computing pad, a mobile device, or any other device, and may represent, for example, a server or a user's computer.

The computer system 270 in this embodiment includes a processing device or processor 272, a main memory 274 (e.g., read-only memory (ROM), flash memory, dynamic random access memory (DRAM), such as synchronous DRAM (SDRAM), etc.), and a static memory 276 (e.g., flash memory, static random access memory (SRAM), etc.), which may communicate with each other via a data bus 278.

Alternatively, the processor 272 may be connected to the main memory 274 and/or static memory 276 directly or via some other connectivity means. The processor 272 may be a controller, and the main memory 274 or static memory 276 may be any type of memory.

The processor 272 represents one or more general-purpose processing devices, such as a microprocessor, central processing unit, or the like. More particularly, the processor 272 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 272 is configured to execute processing logic in instructions for performing the operations and steps discussed herein.

The computer system 270 may further include a network interface device 280. The computer system 270 also may or may not include an input 282, configured to receive input and selections to be communicated to the computer system 270 when executing instructions. The computer system 270 also may or may not include an output 284, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 270 may include a data storage device that includes instructions 288 stored in a computer-readable medium 290. The instructions 288 may also reside, completely or at least partially, within the main memory 274 and/or within the processor 272 during execution thereof by the computer system 270, the main memory 274 and the processor 272 also constituting computer-readable media. The instructions 288 may further be transmitted or received over a network 292 via the network interface device 280.

While the computer-readable medium 290 is shown in an exemplary embodiment to be a single medium, the term "computer-readable medium" shall include a single medium or multiple media (e.g., a centralized or distributed database, and/or associated caches and servers) that store the one or more sets of instructions. The term "computer-readable medium" shall also include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic medium, and carrier wave signals.

The steps of the embodiments disclosed herein may be formed by hardware components or may be embodied in machine-executable instructions, which may be used to cause a general-purpose or special-purpose processor programmed with the instructions to perform the steps, and/or performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); a machine-readable transmission medium (electrical, optical, acoustical, or other form of propagated signals (e.g., carrier waves, infrared signals, digital signals, etc.)); and the like.

Unless specifically stated otherwise and as apparent from the previous discussion, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

The operational steps described in any of the embodiments provide examples and discussion. The operations described may be performed in numerous different sequences other than the illustrated sequences. Operations described in a single operational step may actually be performed in a number of different steps, and one or more operational steps may be combined. Information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, methods set forth shall not be construed as requiring that its steps be performed in a specific order. When a method claim does not actually recite an order to be followed by its steps no particular order shall be inferred.

Various modifications and variations can be made without departing from the spirit or scope of the invention. Since modifications combinations, sub-combinations and variations of the embodiments incorporating the spirit and substance of the invention may occur to persons skilled in the art, the invention should be construed to include everything within the scope of the appended claims and their equivalents.

What is claimed is:

1. A reference signal generation circuit for providing reference signal generation redundancy in a distributed antenna system (DAS), comprising:
   a first reference signal generation module, comprising:
      a first master oscillator configured to generate a first reference signal as a first master oscillator output;
      a first detector coupled to the first master oscillator output, the first detector configured to:
         detect the first reference signal generated by the first master oscillator; and
         provide a first detection output representing a detection state of the first reference signal; and
      a first reference signal switch configured to receive:
         the first reference signal as a first input;
         a second reference signal from a second reference signal generation module as a second input; and
         a first switch control input representing the detection state of the first reference signal;
      the first reference signal switch further configured to:
         provide the first reference signal as a master reference signal on a first master reference signal generation module output to at least one first DAS component in a DAS based on the first switch control input representing detection of the first reference signal by the first detector; and
         provide the second reference signal as the master reference signal on the first master reference signal generation module output to the at least one first DAS component in the DAS based on the first switch control input representing detection failure of the first reference signal by the first detector.

2. The reference signal generation circuit of claim 1, wherein:
   the first reference signal generation module further comprises a second detector coupled to the first master reference signal generation module output of the first reference signal switch, the second detector configured to:
      detect the first master reference signal generation module output provided by the first reference signal switch; and
      provide a second detection output representing a detection state of the first master reference signal generation module output.

3. The reference signal generation circuit of claim 2, wherein:
   the first reference signal generation module further comprises a third detector coupled to the second input of the first reference signal switch, the third detector configured to:
      detect the second reference signal from the second reference signal generation module as the second input into the first reference signal switch; and
      provide a third detection output representing a detection state of the second reference signal from the second reference signal generation module.

4. The reference signal generation circuit of claim 3, wherein:
   the first reference signal switch is further configured to provide the first reference signal as the master reference signal on the first master reference signal generation module output to the at least one first DAS component in the DAS based on the first switch control input representing detection of the first reference signal on the first master reference signal generation module output by the second detector, and detection failure of the second reference signal on the second input of the first reference signal switch by the third detector.

5. The reference signal generation circuit of claim 1, wherein:
   the first reference signal generation module further comprises a second detector coupled to the second input of the first reference signal switch, the second detector configured to:
      detect the second reference signal from the second reference signal generation module as the second input into the first reference signal switch; and
      provide a second detection output representing a detection state of the second reference signal from the second reference signal generation module.

6. The reference signal generation circuit of claim 1, further comprising:
   a second reference signal generation module, comprising:
      a second oscillator configured to generate the second reference signal as a second oscillator output;
      a second detector coupled to the second oscillator output, the second detector configured to:
         detect the second reference signal generated by the second oscillator; and provide a second detection output representing a detection state of the second reference signal; and
a second reference signal switch configured to receive:
the second reference signal as a first input;
the first reference signal from the first reference signal generation module as a second input; and
a second switch control input representing the detection state of the second reference signal;
the second reference signal switch further configured to:
provide the second reference signal as the master reference signal on a second reference signal generation module output to at least one second DAS component in the DAS based on the second switch control input representing detection of the second reference signal by the second detector; and
provide the first reference signal as the master reference signal on the second reference signal generation module output to the at least one second DAS component in the DAS based on the second switch control input representing detection failure of the second reference signal by the second detector.

7. The reference signal generation circuit of claim 6, wherein:
the second reference signal generation module further comprises a third detector coupled to the second reference signal generation module output of the second reference signal switch, the third detector configured to:
detect the second reference signal generation module output provided by the second reference signal switch; and
provide a third detection output representing a detection state of the second reference signal generation module output.

8. The reference signal generation circuit of claim 7, wherein:
the second reference signal generation module further comprises a fourth detector coupled to the second input of the second reference signal switch, the fourth detector configured to:
detect the first reference signal from the first reference signal generation module as the second input into the second reference signal switch; and
provide a fourth detection output representing a detection state of the first reference signal from the first reference signal generation module.

9. The reference signal generation circuit of claim 8, wherein:
the second reference signal switch is further configured to provide the second reference signal as the master reference signal on the second reference signal generation module output to the at least one second DAS component in the DAS based on the second switch control input representing detection of the second reference signal on the second reference signal generation module output by the third detector, and detection failure of the first reference signal on the second input of the second reference signal switch by the fourth detector.

10. The reference signal generation circuit of claim 6, wherein:
the second reference signal generation module further comprises a third detector coupled to the second input of the second reference signal switch, the third detector configured to:
detect the first reference signal from the first reference signal generation module as the second input into the second reference signal switch; and
provide a third detection output representing a detection state of the first reference signal from the first reference signal generation module.

11. The reference signal generation circuit of claim 6, further comprising:
a first communications medium coupling the second reference signal generation module output to the second input of the first reference signal switch; and
a second communications medium coupling the first master reference signal generation module output to the second input of the second reference signal switch.

12. The reference signal generation circuit of claim 6, further comprising a first higher frequency reference signal generation module, comprising:
a first higher frequency signal detector coupled to a first higher frequency reference signal generation module input, the first higher frequency signal detector configured to:
detect the master reference signal provided by the first reference signal generation module; and
provide a first higher frequency detection output representing a detection state of the master reference signal provided by the first reference signal generation module;
a second higher frequency signal detector coupled to a second higher frequency reference signal generation module input, the second higher frequency signal detector configured to:
detect the master reference signal provided by the second reference signal generation module; and
provide a second higher frequency detection output representing a detection state of the master reference signal provided by the second reference signal generation module; and
a first higher frequency signal switch configured to receive:
the master reference signal provided by the first reference signal generation module as a first input on the first higher frequency reference signal generation module input;
the master reference signal provided by the second reference signal generation module as a second input provided on the second higher frequency reference signal generation module input; and
a first higher frequency signal switch control input representing the detection state of the master reference signal provided by the first master reference signal generation module output detected by the first higher frequency signal detector and the detection state of the master reference signal provided by the second reference signal generation module output detected by the second higher frequency signal detector;
the first higher frequency signal switch further configured to:
provide a master higher frequency reference signal based on the master reference signal provided by the first reference signal generation module as a first higher frequency reference signal output, based on the first higher frequency signal switch control input representing detection of the master reference signal provided by the first reference signal generation module by the first higher frequency signal detector; and provide the master higher frequency reference signal based on the master reference signal provided by the second reference signal generation module on the first higher frequency reference signal output, based on the first higher frequency signal switch control input representing detection failure of the master reference signal provided by the second reference signal generation module by the second higher frequency signal detector.

13. The reference signal generation circuit of claim 12, wherein the first higher frequency reference signal generation module further comprises a first phase-locked-loop (PLL) module configured to receive the first higher frequency reference signal output and generate the master higher frequency reference signal as a first PLL higher frequency reference signal on a first PLL module output.

14. The reference signal generation circuit of claim 13, wherein the first higher frequency reference signal generation module further comprises:
a second PLL module configured to receive the first higher frequency reference signal output and generate the master higher frequency reference signal as a second PLL higher frequency reference signal on a second PLL module output;
a first PLL detector coupled to the first PLL module output, the first PLL detector configured to:
detect the first PLL higher frequency reference signal generated by the first PLL module; and
provide a first PLL higher frequency detection output representing a detection state of the first PLL higher frequency reference signal generated by the first PLL module;
a second PLL detector coupled to the second PLL module output, the second PLL detector configured to:
detect the second PLL higher frequency reference signal generated by the second PLL module; and
provide a second PLL higher frequency detection output representing a detection state of the second PLL higher frequency reference signal generated by the second PLL module; and
a first PLL signal switch configured to receive:
the first PLL module output as a first input;
the second PLL module output as a second input; and
a first PLL module control input representing the detection state of the first PLL higher frequency reference signal provided by the first PLL module detected by the first PLL detector and the detection state of the second PLL higher frequency reference signal provided by the second PLL module detected by the second PLL detector;
the first PLL signal switch further configured to:
provide the first PLL higher frequency reference signal as the first higher frequency reference signal output, based on the first PLL module control input representing detection of the first PLL higher frequency reference signal generated by the first PLL module detected by the first PLL detector; and
provide the second PLL higher frequency reference signal as the first higher frequency reference signal output, based on the first PLL module control input representing detection failure of the first PLL higher frequency reference signal generated by the first PLL module detected by the first PLL detector.

15. The reference signal generation circuit of claim 12, further comprising a second higher frequency reference signal generation module, comprising:
a third higher frequency signal detector coupled to a third higher frequency reference signal generation module input, the third higher frequency signal detector configured to:
detect the master reference signal provided by the second reference signal generation module; and
provide a third higher frequency detection output representing a detection state of the master reference signal provided by the second reference signal generation module;
a fourth higher frequency signal detector coupled to a fourth higher frequency reference signal generation module input, the fourth higher frequency signal detector configured to:
detect the master reference signal provided by the first reference signal generation module; and
provide a fourth higher frequency detection output representing a detection state of the master reference signal provided by the first reference signal generation module; and
a second higher frequency signal switch configured to receive:
the master reference signal provided by the second reference signal generation module as a first input on the third higher frequency reference signal generation module input;
the master reference signal provided by the first reference signal generation module as a second input provided on the fourth higher frequency reference signal generation module input; and
a second higher frequency signal switch control input representing the detection state of the master reference signal provided by the second reference signal generation module output detected by the third higher frequency signal detector and the detection state of the master reference signal provided by the first master reference signal generation module output detected by the fourth higher frequency signal detector;
the second higher frequency signal switch further configured to:
provide the master higher frequency reference signal based on the master reference signal provided by the second reference signal generation module as a second higher frequency reference signal output, based on the second higher frequency signal switch control input representing detection of the master reference signal provided by the first reference signal generation module by the third higher frequency signal detector; and
provide the master higher frequency reference signal based on the master reference signal provided by the first reference signal generation module on the second higher frequency reference signal output, based on the second higher frequency signal switch control input representing detection failure of the master reference signal provided by the second reference signal generation module by the fourth higher frequency signal detector.

16. The reference signal generation circuit of claim 15, wherein the second higher frequency reference signal generation module further comprises a third phase-locked-loop (PLL) module configured to receive the second higher frequency reference signal output and generate the master higher frequency reference signal as a third PLL higher frequency reference signal on a third PLL module output.

17. The reference signal generation circuit of claim 16, wherein the second higher frequency reference signal generation module further comprises:
a fourth PLL module configured to receive the second higher frequency reference signal output and generate the master higher frequency reference signal as a fourth PLL higher frequency reference signal on a fourth PLL module output;
a third PLL detector coupled to the third PLL module output, the third PLL detector configured to:
detect the third PLL higher frequency reference signal generated by the third PLL module; and
provide a third PLL higher frequency detection output representing a detection state of the third PLL higher frequency reference signal generated by the third PLL module;
a fourth PLL detector coupled to the fourth PLL module output, the fourth PLL detector configured to:
detect the fourth PLL higher frequency reference signal generated by the fourth PLL module; and
provide a fourth PLL higher frequency detection output representing a detection state of the fourth PLL higher frequency reference signal generated by the fourth PLL module; and
a second PLL signal switch configured to receive:
the third PLL module output as a first input;
the fourth PLL module output as a second input; and
a second PLL module control input representing the detection state of the third PLL higher frequency reference signal provided by the third PLL module detected by the third PLL detector and the detection state of the fourth PLL higher frequency reference signal provided by the fourth PLL module detected by the fourth PLL detector;
the second PLL signal switch further configured to:
provide the third PLL higher frequency reference signal as the second higher frequency reference signal output, based on the second PLL module control input representing detection of the third PLL higher frequency reference signal generated by the third PLL module detected by the third PLL, detector; and
provide the fourth PLL higher frequency reference signal as the second higher frequency reference signal output, based on the second PLL module control input representing detection failure of the third PLL higher frequency reference signal generated by the third PLL module detected by the third PLL detector.

18. The reference signal generation circuit of claim 12, further comprising:
a third communications medium coupling the first master reference signal generation module output to the first higher frequency reference signal generation module input; and
a fourth communications medium coupling the second reference signal generation module output to the second higher frequency reference signal generation module input.

19. The reference signal generation circuit of claim 12, wherein the first reference signal generation module and the first higher frequency reference signal generation module are provided in a same head-end unit equipment chassis.

20. The reference signal generation circuit of claim 12, wherein the first reference signal generation module is provided in a first head-end unit equipment chassis and the first higher frequency reference signal generation module is provided in a second head-end unit equipment chassis different from the first head-end unit equipment chassis.

21. The reference signal generation circuit of claim 6, further comprising:
a third reference signal generation module, comprising:
a third master oscillator configured to generate a third reference signal as a third master oscillator output;
a third detector coupled to the third master oscillator output, the third detector configured to:
detect the third reference signal generated by the third master oscillator; and
provide a third detection output representing a detection state of the third reference signal; and
a third reference signal switch configured to receive:
the third reference signal as a first input;
the second reference signal from the second reference signal generation module as a second input; and
a third switch control input representing the detection state of the third reference signal;
the third reference signal switch further configured to:
provide the third reference signal as the master reference signal on a third master reference signal generation module output to at least one third DAS component in the DAS based on the third switch control input representing detection of the third reference signal by the second detector; and
provide the second reference signal as the master reference signal on the third master reference signal generation module output to the at least one third DAS component in the DAS based on the third switch control input representing detection failure of the third reference signal by the third detector;
wherein the second reference signal from the second reference signal generation module as a second input to the first reference signal switch in the first reference signal generation module is comprised of the third reference signal from the third reference signal generation module.

22. The reference signal generation circuit of claim 6, wherein the first reference signal generation module and the second reference signal generation module are provided in a same head-end unit equipment chassis.

23. The reference signal generation circuit of claim 6, wherein the first reference signal generation module is provided in a first head-end unit equipment chassis and the second reference signal generation module is provided in a second head-end unit equipment chassis different from the first head-end unit equipment chassis.

* * * * *